United States Patent
Ortiz et al.

(10) Patent No.: US 11,852,774 B2
(45) Date of Patent: Dec. 26, 2023

(54) EVALUATION AND VISUALIZATION OF WELL LOG DATA IN SELECTED THREE-DIMENSIONAL VOLUME

(71) Applicant: Halliburton Energy Services, Inc., Houston, TX (US)

(72) Inventors: David J. Ortiz, Spring, TX (US); Jeremy Combs, The Woodlands, TX (US); Vladimir Yuryevich Kiselev, Conroe, TX (US); Renata Da Gama Saintive, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/095,422

(22) Filed: Nov. 11, 2020

(65) Prior Publication Data
US 2022/0146703 A1    May 12, 2022

(51) Int. Cl.
*G01V 3/38*    (2006.01)
*H04Q 9/00*    (2006.01)
(Continued)

(52) U.S. Cl.
CPC .................. *G01V 3/38* (2013.01); *G01V 3/18* (2013.01); *G06T 15/08* (2013.01); *G06T 19/20* (2013.01);
(Continued)

(58) Field of Classification Search
CPC .. G01V 3/38; G01V 3/18; G06T 15/08; G06T 19/20; G06T 2200/24; G06T 2215/16;
(Continued)

(56) References Cited

U.S. PATENT DOCUMENTS 8,577,660 B2 * 11/2013 Wendt .................... G01V 11/00
703/7
8,599,215 B1 * 12/2013 Boitano ................ G06T 3/4038
345/631

(Continued)

OTHER PUBLICATIONS

Xie, "Application Research Of Web3D Technology In Three-dimensional Show Of Oil Well Pitshaft Information", 2012, FSKD (Year: 2012).*

(Continued)

*Primary Examiner* — YuJang Tswei
(74) *Attorney, Agent, or Firm* — Benjamin Ford; Parker Justiss, P.C.

(57) ABSTRACT

A method is provided for processing sensor data associated with a formation. The sensor data is obtained and divided into a plurality of voxels in a three-dimensional environment. Each voxel corresponds to a location in the formation surrounding a wellbore. A selection of a first point in the three-dimensional environment corresponding to a first position along the wellbore is received. A selection of a first two-dimensional shape intersecting the first point is received. A selection of a second point corresponding to a second position different from the first position along the wellbore is received. A three-dimensional volume containing a subset of the plurality of voxels of sensor data is generated. The three-dimensional volume is bound at least by the first point and the first two-dimensional shape at a first end and by the second point at a second end. The generated three-dimensional volume is rendered for output on a display.

17 Claims, 19 Drawing Sheets

(51) Int. Cl.
G06T 15/08 (2011.01)
G06T 19/20 (2011.01)
G01V 3/18 (2006.01)

(52) U.S. Cl.
CPC .......... *H04Q 9/00* (2013.01); *G06T 2200/24* (2013.01); *G06T 2215/16* (2013.01); *G06T 2219/2012* (2013.01); *G06T 2219/2021* (2013.01); *H04Q 2209/30* (2013.01)

(58) Field of Classification Search
CPC .... G06T 2219/2012; G06T 2219/2021; H04Q 9/00; H04Q 2209/30
See application file for complete search history.

(56) References Cited

U.S. PATENT DOCUMENTS

| | | | | |
|---|---|---|---|---|
| 9,223,041 | B2* | 12/2015 | Wendt | G01V 1/306 |
| 10,217,279 | B2* | 2/2019 | Whalley | E21B 47/002 |
| 10,776,989 | B1* | 9/2020 | Douglas | G06T 7/0012 |
| 2002/0072883 | A1* | 6/2002 | Lim | G06T 17/05 |
| | | | | 703/2 |
| 2009/0303233 | A1 | 12/2009 | Lin et al. | |
| 2010/0169018 | A1* | 7/2010 | Brooks | E21B 47/09 |
| | | | | 702/9 |
| 2011/0112802 | A1* | 5/2011 | Wilson | E21B 7/04 |
| | | | | 703/1 |
| 2011/0259599 | A1* | 10/2011 | Walker | G06F 17/00 |
| | | | | 703/1 |
| 2012/0207366 | A1* | 8/2012 | Liu | G06T 7/187 |
| | | | | 382/128 |
| 2013/0110486 | A1 | 5/2013 | Polyakov et al. | |
| 2016/0130916 | A1* | 5/2016 | Abadie | G01V 1/50 |
| | | | | 703/10 |
| 2016/0163100 | A1 | 6/2016 | FitzSimmons | |
| 2016/0319642 | A1 | 11/2016 | Ahmed | |
| 2017/0192403 | A1 | 7/2017 | Cameron et al. | |
| 2017/0243383 | A1 | 8/2017 | Gillan et al. | |
| 2018/0023385 | A1* | 1/2018 | Bang | E21B 47/024 |
| | | | | 175/45 |
| 2018/0140359 | A1* | 5/2018 | Koyrakh | A61B 34/20 |
| 2018/0164434 | A1* | 6/2018 | Stokes | G01S 7/6263 |
| 2018/0203144 | A1* | 7/2018 | Karrenbach | G01D 5/3538 |
| 2019/0022854 | A1* | 1/2019 | Hackert | A01D 43/00 |
| 2019/0175057 | A1* | 6/2019 | Krimsky | A61B 1/00009 |
| 2021/0248922 | A1* | 8/2021 | Gordon | G09B 9/00 |

OTHER PUBLICATIONS

International Search Report and Written Opinion issued in related PCT Application No. PCT/US2020/060757 dated Jul. 21, 2021, 9 pages.

* cited by examiner

EVALUATION AND VISUALIZATION OF WELL LOG DATA IN SELECTED THREE-DIMENSIONAL VOLUME

TECHNICAL FIELD

The present disclosure relates generally to well drilling operations and, more particularly, to visualization and evaluation of well log data related to downhole formations proximate to a wellbore.

BACKGROUND

Modern oil field operators demand access to a great quantity of information regarding the parameters and conditions encountered downhole. Such information typically includes characteristics of the earth formations traversed by the wellbore and data relating to the size and configuration of the wellbore itself. The collection of information relating to conditions downhole, which commonly is referred to as "logging," can be performed by several methods including wireline logging and "logging while drilling" (LWD).

In wireline logging, a probe or "sonde" is lowered into the wellbore after some or all of the well has been drilled. The sonde hangs at the end of a long cable or "wireline" that provides mechanical support to the sonde and also provides an electrical connection between the sonde and electrical equipment located at the surface of the well. In accordance with existing logging techniques, various parameters of the earth's formations are measured and correlated with the position of the sonde in the wellbore as the sonde is pulled uphole. In LWD, the drilling assembly includes sensing instruments that measure various parameters as the formation is being penetrated, thereby enabling measurements of the formation while it is less affected by fluid invasion.

Various measurement tools exist for use in wireline logging and LWD applications. One such tool is the resistivity tool, which includes one or more antennas for transmitting an electromagnetic signal into the formation and one or more antennas for receiving a formation response. When operated at low frequencies, the resistivity tool may be called an "induction" tool, and at high frequencies it may be called an electromagnetic wave propagation tool. Though the physical phenomena that dominate the measurement may vary with frequency, the operating principles for the tool are consistent. In some cases, the amplitude and/or the phase of the received signals are compared to the amplitude and/or phase of the transmitted signals to measure the formation resistivity. In other cases, the amplitude and/or phase of the received signals are compared to each other to measure the formation resistivity.

In these and other logging environments, measured parameters are usually recorded and displayed in the form of a log, for example, a two-dimensional graph showing the measured parameter as a function of tool position or depth. For example, when plotted as a function of depth or tool position in the wellbore, the resistivity tool measurements are termed "resistivity logs". In addition to making parameter measurements as a function of depth, some logging tools also provide parameter measurements as a function of azimuth. Such tool measurements have often been displayed as two-dimensional images of the wellbore wall, with one dimension representing tool position or depth, the other dimension representing azimuthal orientation, and the pixel intensity or color representing the parameter value.

Recently, however, improved logging tools have been developed that can measure one or more formation parameters as a function of distance from the wellbore axis, as well as depth and azimuth. Such additional information would provide very helpful insight to drillers and other users of log information. For example, such logs may provide indications of hydrocarbon concentrations and other information useful to drillers and completion engineers. In particular, three-dimensional inversions may provide information useful for steering the drilling assembly.

However, the traditional telemetry and data presentation methods are increasingly unable to meaningfully convey such additional information.

BRIEF DESCRIPTION OF THE DRAWINGS

Some specific exemplary aspects of the disclosure may be understood by referring, in part, to the following description and the accompanying drawings.

Figure 1:
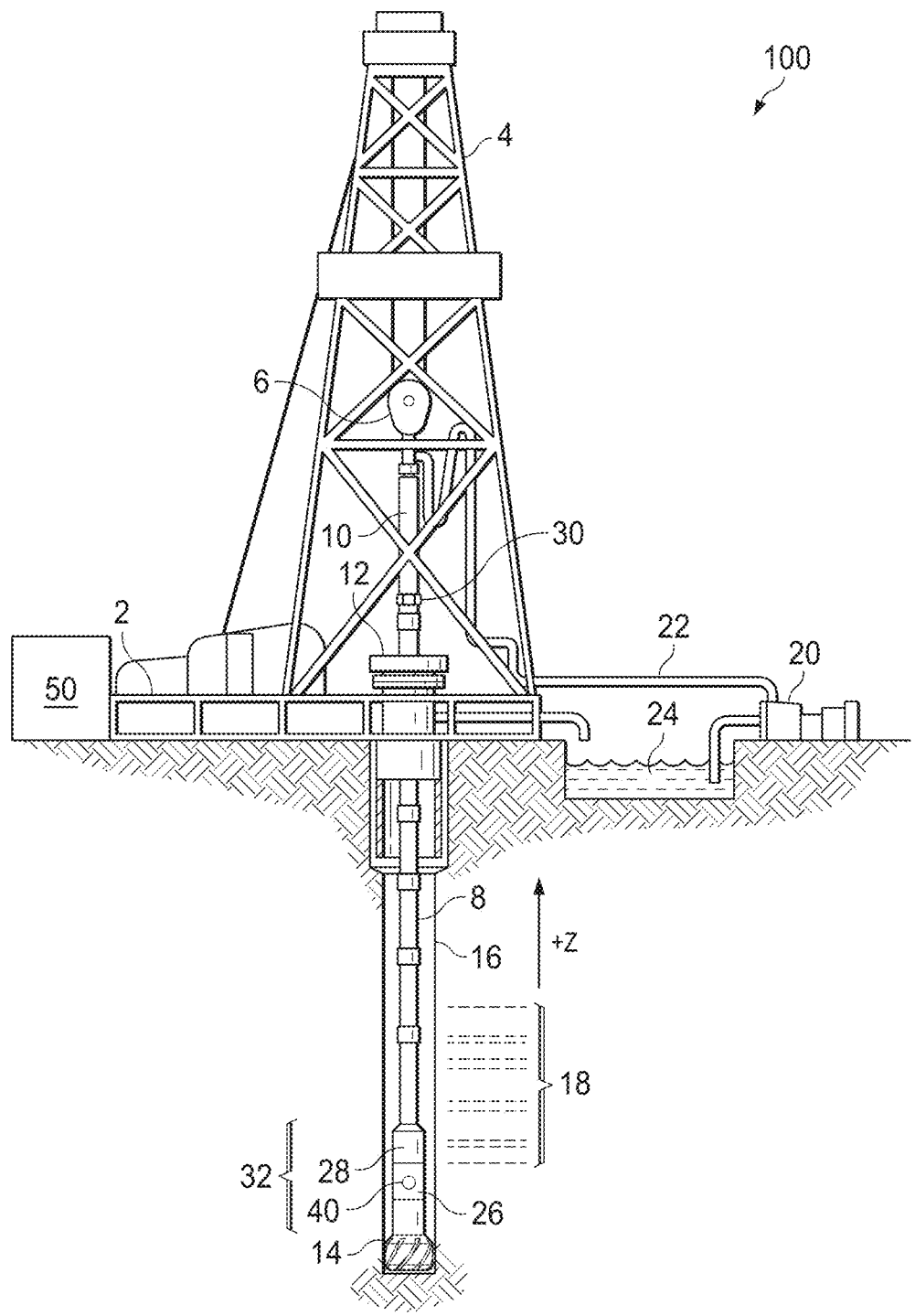
FIG. 1 shows an illustrative logging while drilling (LWD) system, in accordance with one or more aspects of the present disclosure.

While aspects of this disclosure have been depicted and described and are defined by reference to exemplary aspects of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described aspects of this disclosure are examples only, and not exhaustive of the scope of the disclosure.

DESCRIPTION OF CERTAIN EMBODIMENTS

The present application relates to processing well log data associated with a formation proximate to a wellbore. Such well log data may include sensor data regarding any desired formation parameter that is collected during wireline logging or LWD processes, among others. Such well log data may include, for example, resistivity data, acoustic data, nuclear magnetic resonance (NMR) data, and any other desired sensor data collected during a well logging procedure. Aspects of the present disclosure provide improved techniques for processing and visualizing three-dimensional data (such as, e.g., resistivity inversions of a reservoir) relating to formations proximate to a wellbore. One or more aspects provide techniques for generating a three-dimensional volume representing a resistivity, acoustic, NMR, or other data field in a selected portion of the formation in a specific area surrounding a wellbore. The three-dimensional volume, when rendered and displayed on a display device, visually shows a clear representation of the resistivity, acoustic, NMR, or other data field around the wellbore at the selected portion of the formation. One or more aspects provide techniques for generating the three-dimensional volume based on user selections. For example, one or more aspects provide techniques for generating the three-dimensional volume as being bound by a selected first point representing a position along a length of the wellbore, a selected second point representing another position along the length of the wellbore, and a selected two-dimensional shape intersecting the first point. One or more aspects provide techniques for filtering the sensor data illustrated in the generated three-dimensional volume. The model of resistivity, acoustic, NMR, or other sensor data in the generated three-dimensional volume provides a comprehensive and easily understood illustration of the distribution of formation measurement values in an area of interest surrounding the wellbore.

The techniques for processing and visualizing three-dimensional sensor data as discussed in accordance with aspects of the present disclosure provide several advantages over current techniques. For example, a clear visual representation of the resistivity, acoustic, NMR, or other data field around selected portions of the wellbore allows an operator to quickly and accurately interpret three-dimensional inversion data and make accurate geosteering decisions. Even complex geological scenarios may be accurately interpreted with minimal effort, as user selections enable the generation of a three-dimensional volume on a scale that is easily understood. This may minimize time, costs and risks related to such systems. Further, the clear representation of the resistivity, acoustic, NMR, or other data field in an area of interest around the wellbore helps reduce uncertainties typically associated with large three-dimensional inversions of a formation.

In addition, the techniques described herein improve rendering of three-dimensional inversion data by generating a more accurate rendering of the resistivity, acoustic, NMR, or other data field of a formation in a portion of interest surrounding the wellbore, for example, as illustrated with respect to FIGS. 4A-5F. Further, by generating a more accurate rendering of the three-dimensional resistivity, acoustic, NMR, or other data, these techniques reduce inaccuracies generally associated with rendering three-dimensional sensor data, for example, as illustrated with respect to FIGS. 4A-5F. Thus, the techniques discussed herein improve the overall quality of rendering three-dimensional sensor data.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (for example, a hard disk drive or floppy disk drive), a sequential access storage device (for example, a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

Illustrative aspects of the present disclosure are described in detail herein. In the interest of clarity, not all features of an actual implementation may be described in this specification. It will of course be appreciated that in the development of any such actual aspect, numerous implementation specific decisions are made to achieve the specific implementation goals, which will vary from one implementation to another. Moreover, it will be appreciated that such a development effort might be complex and time-consuming, but would, nevertheless, be a routine undertaking for those of ordinary skill in the art having the benefit of the present disclosure.

To facilitate a better understanding of the present disclosure, the following examples of certain aspects are given. In no way should the following examples be read to limit, or define, the scope of the invention. Aspects of the present disclosure may be applicable to horizontal, vertical, deviated, or otherwise nonlinear wellbores in any type of subterranean formation. Aspects may be applicable to injection wells as well as production wells, including hydrocarbon wells. Aspects may be implemented using a tool that is made suitable for testing, retrieval and sampling along sections of the formation. Aspects may be implemented with tools that, for example, may be conveyed through a flow passage in tubular string or using a wireline, slickline, coiled tubing, downhole robot or the like. "Measurement-while-drilling" ("MWD") is the term generally used for measuring conditions downhole concerning the movement and location of the drilling assembly while the drilling continues. "Logging-while-drilling" ("LWD") is the term generally used for similar techniques that concentrate more on formation parameter measurement. Devices and methods in accordance with certain aspects may be used in one or more of wireline (including wireline, slickline, and coiled tubing), downhole robot, MWD, and LWD operations.

FIG. 1 shows an illustrative logging while drilling (LWD) system 100 in which aspects of the present disclosure may be practiced. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As the drill bit 14 rotates, it creates a wellbore 16 that passes through various formations 18. A pump 20 circulates drilling fluid through a feed pipe 22 to the kelly 10, downhole through the interior of drill string 8, through orifices in the drill bit 14, back to the surface via the annulus around drill string 8, and into a retention pit 24. The drilling fluid transports cuttings from the wellbore 16 into the pit 24 and aids in maintaining the wellbore integrity.

An LWD tool 26 is integrated into a bottom-hole assembly (BHA) 32 near the bit 14. As the bit extends the wellbore 16 through the formations, the logging tool 26 collects measurements relating to various formation properties as well as the tool orientation and various other drilling conditions. The logging tool 26 may take the form of a drill collar, for example, a thick-walled tubular that provides weight and rigidity to aid the drilling process. A telemetry sub 28 may be included to transfer tool measurements to a surface receiver 30 and to receive commands from the surface. In one or more aspects, the telemetry sub 28 does not communicate with the surface, but rather stores logging data for later retrieval at the surface when the logging assembly is recovered. In both approaches, limitations are placed on the amount of data that can be collected and stored or communicated to the surface. In certain aspects, the LWD system 100 includes a data processing system 50 (for example, a computer system) positioned at the surface. The data processing system 50 may be communicably coupled to the surface receiver 30 and may receive data collected by the logging tool 26 and/or transmit commands to the logging tool 26 through the surface receiver 30. The data processing system 50 may process the data and generate visualizations for display so as to aid a human operator in steering the wellbore with respect to bed boundaries and/or other wellbores, for example, towards hydrocarbon deposits. For example, as will be described below, the data processing system 50 may process three-dimensional sensor data (e.g., resistivity, acoustic, NMR, or other well log data) and generate visualizations of selected three-dimensional volumes of the formation for a user display so as to aid an operator's interpretation and understanding of a resistivity, acoustic, NMR, or other data field surrounding the wellbore.

Figure 2:
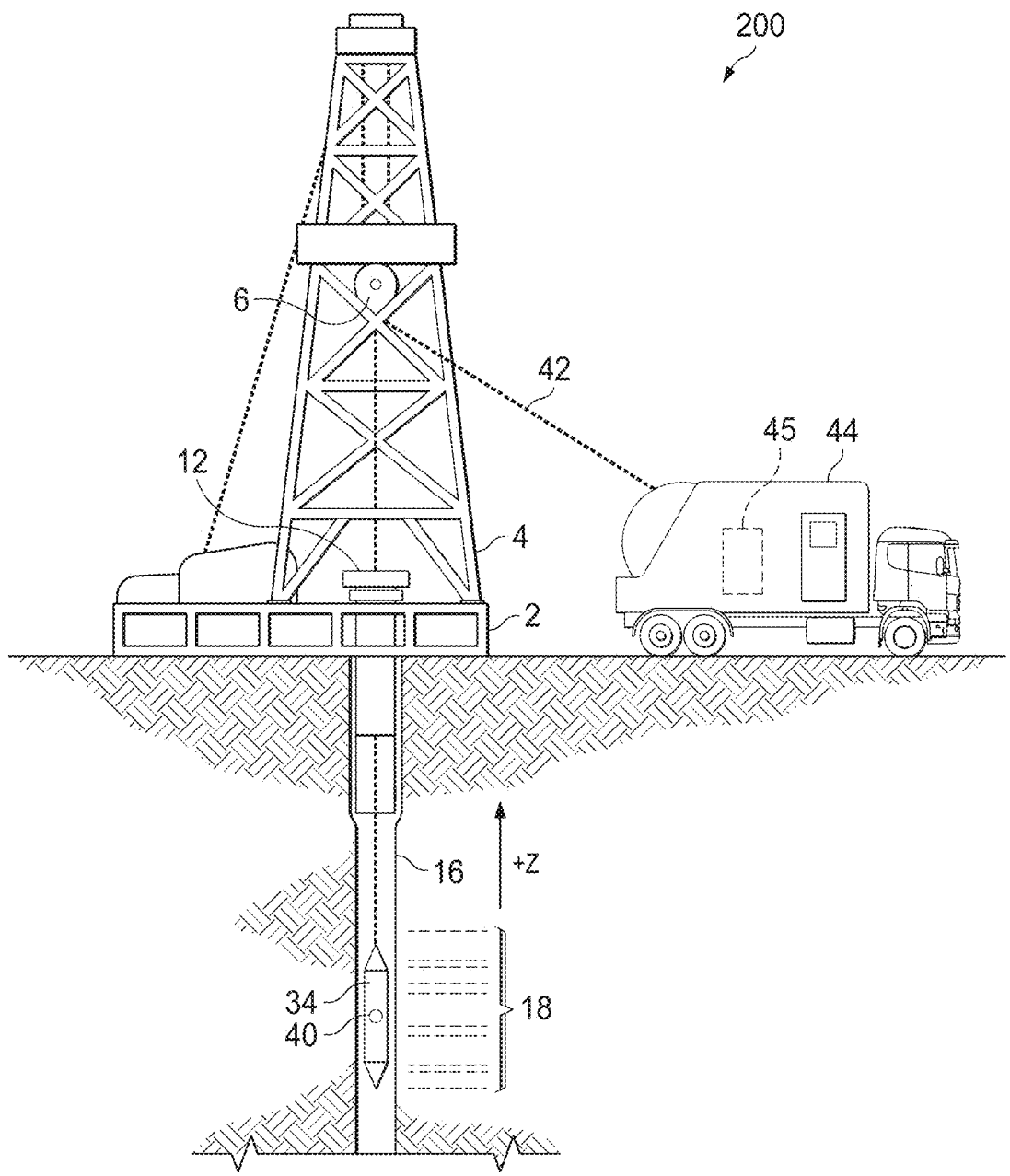
FIG. 2 shows an illustrative wireline logging system, in accordance with one or more aspects of the present disclosure.

At various times during the drilling process, the drill string 8 may be removed from the wellbore as shown in the wireline logging system 200 of FIG. 2. Once the drill string has been removed, logging operations can be conducted using a wireline logging tool 34, for example, a sensing instrument sonde suspended by a cable 42 having conductors for transporting power to the tool and telemetry from the tool to the surface. A wireline logging tool 34 may have pads, centralizing springs or both to maintain the logging tool 34 near the axis of the wellbore 16 as the logging tool 34 is pulled uphole. A logging facility 44 collects measurements from the logging tool 34, and includes a data processing system 45 (for example, computer system) for storing and processing the measurements gathered by the logging tool 34. As will be described below, the data processing system 45 may process three-dimensional sensor data and generate visualizations of selected three-dimensional volumes of the formation for a user display so as to aid an operator's interpretation and understanding of a three-dimensional field surrounding the wellbore.

In each of the foregoing logging environments, the logging tools 26 and 34 of the LWD system of FIG. 1 and the wireline logging system of FIG. 2, respectively, preferably include a navigational sensor package 40 that includes directional sensors for determining the inclination angle, the horizontal angle, and the rotational angle (a.k.a. "tool face angle") of the logging tool. As is commonly defined in the art, the inclination angle is the deviation from vertically downward, the horizontal angle is the angle in a horizontal plane from true North, and the tool face angle is the orientation (rotational about the tool axis) angle from the high side of the wellbore. In accordance with known techniques, wellbore directional measurements can be made as follows: a three-axis accelerometer measures the earth's gravitational field vector relative to the tool axis and a point on the circumference of the tool called the "tool face scribe line". The tool face scribe line is typically drawn on the surface of the logging tool 26 or logging tool 34 as a line parallel to the tool axis. From this measurement, the inclination and tool face angle of the BHA can be determined. Additionally, a three-axis magnetometer measures the earth's magnetic field vector in a similar manner. From the combined magnetometer and accelerometer data, the horizontal angle of the BHA may be determined.

Moreover, the logging tool in each of the foregoing environments measures (via one or more sensors) at least one formation parameter (e.g., resistivity, acoustic measurements, NMR measurements, etc.) as a function of tool depth (or position along the wellbore), azimuth, and radial distance from the wellbore axis. Such measurements may be made, for example, by an azimuthally sensitive resistivity logging tool having multiple depths of investigation. Other suitable logging tools may include a "wellbore radar" assembly that detects reflections of high-frequency electromagnetic waves, or ultrasonic imaging tools that similarly detect reflections of acoustic impulses. Certain proposed nuclear logging tools will also provide formation property measurements as a function of position, azimuth, and radial distance. Of course, data from multiple tools can also be combined to further characterize formation properties.

As such logging tools progress along the wellbore, they rotate, employ an azimuthally-distributed array and/or direct azimuthally-steerable sensors 40 to collect measurements as a function of azimuth and radial distance. In some aspects (for example, wireline logging sondes that do not move too quickly), all of the logging data can be conveyed to the surface as it is collected. Such information can be quite valuable to enable the driller to steer the wellbore with respect to bed boundaries and/or other wellbores, thereby, for example, increasing path lengths through the payzone.

Figure 3:
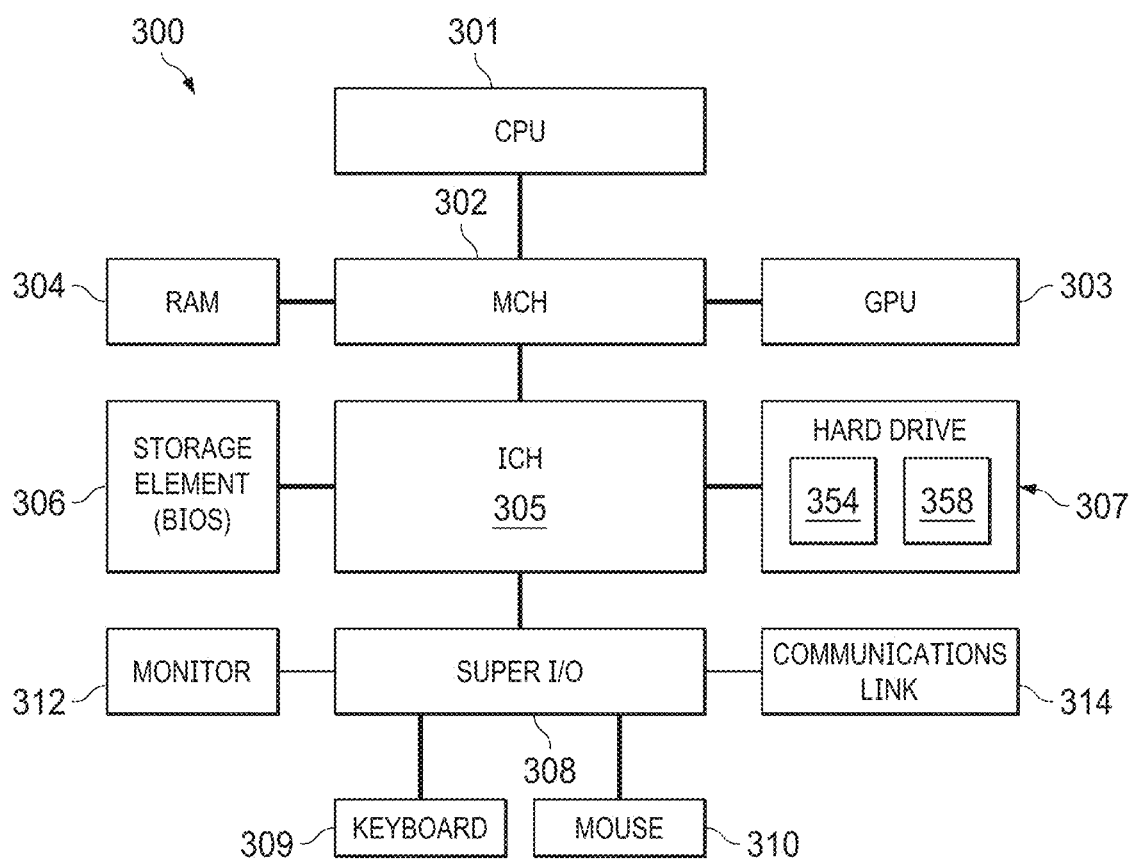
FIG. 3 is a diagram illustrating an example information handling system, in accordance with one or more aspects of the present disclosure.

FIG. 3 is a diagram illustrating an example information handling system 300, for example, for use with or by the LWD system of FIG. 1 or the wireline logging system of FIG. 2, according to one or more aspects of the present disclosure. The data processing systems 45 and 50 discussed above with reference to FIGS. 1 and 2 may take a form similar to the information handling system 300. A processor or central processing unit (CPU) 301 of the information handling system 300 is communicatively coupled to a memory controller hub (MCH) or north bridge 302. The processor 301 may include, for example a microprocessor, microcontroller, digital signal processor (DSP), application specific integrated circuit (ASIC), or any other digital or analog circuitry configured to interpret and/or execute program instructions and/or process data. The processor 301 may be configured to interpret and/or execute program instructions or other data retrieved and stored in any memory such as a memory 304 or a hard drive 307. Program instructions or other data may constitute portions of a software or application, for example application 358 or data 354, for carrying out one or more methods described herein. The memory 304 may include read-only memory (ROM), random access memory (RAM), solid state memory, or disk-based memory. Each memory module may include any system, device, or apparatus configured to retain program instructions and/or data for a period of time (for example, non-transitory computer-readable media). For example, instructions from a software or application 358 or data 354 may be retrieved and stored in the memory 304 for execution or use by the processor 301. In one or more aspects, the memory 304 or the hard drive 307 may include or comprise one or more non-transitory executable instructions that, when executed by the processor 301, cause the processor 301 to perform or initiate one or more operations or steps. The information handling system 300 may be preprogrammed or it may be programmed (and reprogrammed) by loading a program from another source (for example, from a CD-ROM, from another computer device through a data network, or in another manner).

The data 354 may include treatment data, geological data, fracture data, seismic or micro seismic data, or any other appropriate data. In one or more aspects, a memory of a computing device includes additional or different data, application, models, or other information. In one or more aspects, the data 354 may include geological data relating to one or more geological properties of the subterranean formation (for example, formation 18 shown in FIG. 1). For example, the geological data may include information on the wellbore, completions, or information on other attributes of the subterranean formation. In one or more aspects, the geological data includes information on the lithology, fluid content, stress profile (for example, stress anisotropy, maximum and minimum horizontal stresses), pressure profile, spatial extent, or other attributes of one or more rock formations in the subterranean zone. The geological data may include information collected from well logs, rock samples, outcroppings, seismic or microseismic imaging, or other data sources.

The one or more applications 358 may comprise one or more software applications, one or more scripts, one or more programs, one or more functions, one or more executables, or one or more other modules that are interpreted or executed by the processor 301. The one or more applications 358 may include one or more machine-readable instructions for performing one or more of the operations related to any one or more aspects of the present disclosure. The one or more applications 358 may include machine-readable instructions for processing and visualization of sensor data, as illustrated in FIGS. 4A-5F. The one or more applications 358 may obtain input data, such as seismic data, well data, treatment data, geological data, fracture data, or other types of input data, from the memory 304, from another local source, or from one or more remote sources (for example, via one or more communication links 314). The one or more applications 358 may generate output data and store the output data in the memory 304, in the hard drive 307, in another local medium, or in one or more remote devices (for example, by sending the output data via the communication link 314).

Modifications, additions, or omissions may be made to FIG. 3 without departing from the scope of the present disclosure. For example, FIG. 3 shows a particular configuration of components of the information handling system 300. However, any suitable configurations of components may be used. For example, components of the information handling system 300 may be implemented either as physical or logical components. Furthermore, in one or more aspects, functionality associated with components of the information handling system 300 may be implemented in special purpose circuits or components. In other aspects, functionality associated with components of the information handling system 300 may be implemented in configurable general purpose circuits or components. For example, components of the information handling system 300 may be implemented by configured computer program instructions.

The memory controller hub 302 may include a memory controller for directing information to or from various system memory components within the information handling system 300, such as the memory 304, a storage element 306, and the hard drive 307. The memory controller hub 302 may be coupled to the memory 304 and a graphics processing unit (GPU) 303.

The memory controller hub 302 may also be coupled to an I/O controller hub (ICH) or south bridge 305. The I/O controller hub 305 is coupled to storage elements of the information handling system 300, including the storage element 306, which may include a flash ROM that includes a basic input/output system (BIOS) of the computer system. The I/O controller hub 305 may also be coupled to the hard drive 307 of the information handling system 300. The I/O controller hub 305 may also be coupled to an I/O chip or interface, for example, a Super I/O chip 308, which is itself coupled to several of the I/O ports of the computer system, including a keyboard 309, a mouse 310, a monitor 312 and one or more communications links 314. Any one or more input/output devices receive and transmit data in analog or digital form over one or more communication links 314 such as a serial link, a wireless link (for example, infrared, radio frequency, or others), a parallel link, or another type of link. The one or more communication links 314 may include any type of communication channel, connector, data communication network, or other link. For example, the one or more communication links 314 may comprise a wireless or a wired network, a Local Area Network (LAN), a Wide Area Network (WAN), a private network, a public network (such as the Internet), a wireless fidelity or WiFi network, a network that includes a satellite link, or another type of data communication network.

A key challenge in determining properties of a formation proximate to a wellbore is interpretation of log data collected by logging tools such as an LWD tool (for example, LWD tool 26 as shown in FIG. 1). Accurate interpretation of log data may provide indications of hydrocarbon concentrations and other information useful to drillers and completion engineers. In particular, interpreting three-dimensional resistivity inversions may provide information useful for steering a drilling assembly towards hydrocarbon deposits.

Existing logging systems typically generate various illustrations including plots and images based on the collected log data for viewing on a display device to aid in interpretation of the log data by a user. For example, plots of one or more formation properties such as resistivity, acoustic, NMR, gamma, porosity and density may be generated as a function of depth and/or position. The depth may be a true vertical depth (TVD) or a measured depth (MD) and the position may be a spatial position with respect to a wellhead. Other variations in illustration are also possible. A user may view and interpret these illustrations on a display device (for example, a display of a computer system related to a logging environment) in order to quantitatively analyze the formation properties proximate to the wellbore.

Three-dimensional inversion data can be valuable in evaluation of subterranean formations. A comprehensive geological analysis of a formation (for example, formation 18 as shown in FIG. 1) proximate to a wellbore requires an interpretation of available three-dimensional resistivity, acoustic, NMR, or other data for a clear understanding of the electromagnetic, acoustic, magnetic, or other field in an area of interest surrounding the wellbore. Interpreting three-dimensional inversion models of resistivity, acoustic, NMR, or other sensor data related to downhole formations (for example, obtained from LWD, MWD, and/or wireline logging applications) generated based on current data evaluation and illustration techniques can be very challenging. Traditional illustrations of three-dimensional inversion data do not include clear and easy to interpret visual representations of the formation parameter distribution in a user selected area of interest around the wellbore (for example, at a selected measured depth of or distance from the wellbore). A user generally needs to interpret such information based on a combination of plots and images presented on a display device. Thus, current techniques for evaluation and illustration of three-dimensional sensor data may generally involve considerable time and effort in the user interpretation of the resistivity, acoustic, NMR, or other distribution around the wellbore. Further, such interpretations may be prone to errors in interpretation as a result of the complexities involved in interpreting traditional three-dimensional sensor data illustrations. Thus, current systems may involve increased time, cost, and risk burden. For example, a user may take erroneous steering decisions based on an erroneous interpretation of a resistivity field around the wellbore. In addition, a user may choose not to take steering decisions that would otherwise place the wellbore through a desired formation with higher concentrations of hydrocarbon.

Aspects of the present disclosure provide improved techniques for processing and visualizing three-dimensional inversion data relating to formations proximate to a wellbore. One or more aspects provide techniques for generating a three-dimensional volume representing a resistivity, acoustic, NMR, or other data field associated with a portion of the formation surrounding the wellbore in a volume of interest. The three-dimensional volume, when rendered and displayed on a display device, visually shows a clear representation of the resistivity, acoustic, NMR, or other data field surrounding the wellbore in the volume of interest, as opposed to a large three-dimensional field encompassing all sensor measurements taken around the wellbore, or two-dimensional logs. One or more aspects provide techniques for generating the three-dimensional volume based on a user selected volume of interest in a three-dimensional environment, the user selected volume being either a container or an area extending along the well path. One or more aspects provide techniques for filtering the sensor data corresponding to the generated three-dimensional volume. One or more aspects provide techniques for calculating, based on the sensor data in the generated three-dimensional volume, a volume of hydrocarbons located in the portion of the formation corresponding to the generated three-dimensional volume. One or more aspects provide techniques for assigning each voxel in the generated three-dimensional volume to one of a plurality of material types (e.g., oil, gas, water, etc.) based on calculations performed on the sensor data, enabling selective rendering and displaying a visual representation of the location of each of the plurality of materials in the formation volume of interest.

The techniques for processing and visualizing three-dimensional inversion data as discussed in accordance with aspects of the present disclosure provide several advantages over current techniques. For example, a clear visual representation of the resistivity, acoustic, NMR, or other data field around the wellbore in selected volumes surrounding the wellbore allows a user to quickly and accurately interpret the three-dimensional sensor data, visualize where hydrocarbon (or other material) is located along or near the wellbore, and make accurate geosteering decisions based thereon. Even complex geological scenarios may be accurately interpreted with minimal effort. This may minimize time, costs and risks related to such systems. Further, the clear representation of the resistivity, acoustic, NMR, or other data field in selected volumes of the formation surrounding the wellbore helps an operator to clearly, easily, and more accurately estimate the shape and location of oil reserves in the formation with minimal effort. The clear representation of the resistivity, acoustic, NMR, or other data field in selected volumes of the formation surrounding the wellbore also minimizes the error of such calculations, since the user can visualize and selectively filter the data. In addition, the techniques for processing and visualizing three-dimensional sensor data as discussed in accordance with aspects of the present disclosure allow a user to quickly and accurately interpret three-dimensional well log data in irregularly shaped volumes of interest.

In certain aspects, for purposes of resistivity, acoustic, NMR, or other data collection and analysis in accordance with aspects of the present disclosure, a three-dimensional environment may be conceptually divided into a preconfigured number of voxels, where each voxel corresponds to a location or a range of locations in three-dimensional space within the formation proximate to the wellbore. The sensor data associated with each voxel may be measured in one or more specific depth, radial, and/or azimuthal directions or range of directions. For each of the voxels resulting from the division, the logging tool (for example, logging tool 26 or logging tool 34) may provide multiple measurements in the corresponding one or more directions. In one or more aspects, the number of voxels into which the sensor data is divided is a function of a selected resolution around, along, and/or looking ahead of the wellbore.

In certain aspects, the generation of a three-dimensional volume may be based at least in part on user selections that are input through one or more I/O devices such as a keyboard, a mouse, and a video display of an information handling system (e.g., 300 of FIG. 3). Prior to and during generation of the three-dimensional volume, one or more user selections may be rendered for display on a display device of the information handling system.

FIGS. 4A-4G and 5A-5F illustrate an example graphical user interface 400 for display on a display device, the graphical user interface 400 showing an example three-dimensional volume 402 generated and rendered for display within a three-dimensional environment 404. In certain aspects, prior to and during generation of the three-dimensional volume 402, the information handling system (e.g., 300 of FIG. 3) may render a three-dimensional environment 404 for display on the display device, the three-dimensional environment 404 encompassing up to all formation locations in which formation measurements of a preconfigured resolution are available. Each voxel of measured data may correspond to a location in one or more formations (e.g., 18 of FIGS. 1 and 2) surrounding the wellbore (e.g., 16 of FIG. 1), and each voxel may be mapped to a location in the three-dimensional environment 404. In certain aspects, the measured data may be rendered for display as a three-dimensional model 406 within the three-dimensional environment 404 on the display device.

In the illustrated embodiment of FIGS. 4A-5F, the sensor data being rendered for display is resistivity. However, it should be noted that other types of three-dimensional sensor data (e.g., acoustic data, NMR data, or other parameters measured via downhole logging devices) may be similarly rendered for display, filtered, and used to perform calculations. The following description, while discussing the display and interpretation of resistivity data in particular, may be applied similarly to all other types of three-dimensional formation data that may be collected during well logging and other operations.

Figure 4A:
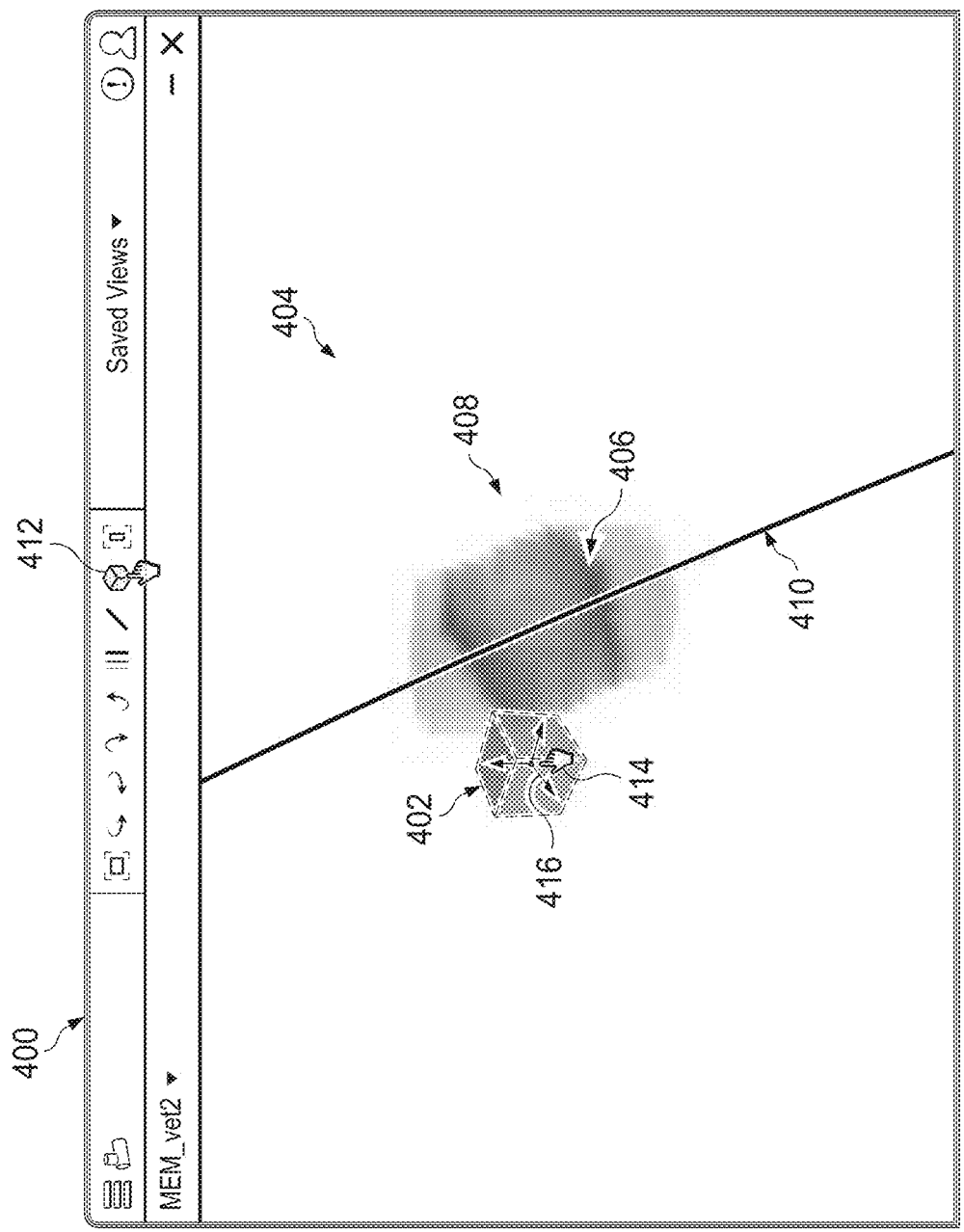
FIGS. 4A-4E illustrate an example data set of resistivity data in a three-dimensional environment and the generation of an example three-dimensional volume for display of resistivity data within the three-dimensional volume, in accordance with one or more aspects of the present disclosure.

In one or more aspects, additionally or alternatively, one or more resistivity values in the three-dimensional model 406 may be represented by assigning different colors 408 or shading to different ranges of resistivity values. For example, lighter colors, shading, or less concentrated pixelation may represent smaller resistivity values and darker colors, shading, or more concentrated pixelation may represent higher resistivity values. FIG. 4A illustrates an example of the three-dimensional model 406 of measured resistivity data in the three-dimensional environment 404.

In certain aspects, the voxels of the measured resistivity data may be rendered for display as the three-dimensional model 406 prior to generation of the three-dimensional volume 402. In other aspects, measured resistivity data may not be rendered for display on the display device until after the three-dimensional volume 402 is generated. In still other aspects, the measured resistivity data may be selectively displayed in the three-dimensional environment 404 on the display device prior to the generation of the three-dimensional volume 402.

In certain aspects, a track image 410 representing a wellbore (e.g., 16 of FIG. 1) may be rendered for display in the three-dimensional environment 404 on the display device along with resistivity measurements. Different points along a length of the track image 410 in the three-dimensional environment 404 may correspond to different locations along the length of the wellbore. The information handling system may track the position of the wellbore in the three-dimensional environment based on wellbore directional measurements received at the information handling system from one or more sensors in a BHA (e.g., 32 of FIG. 1). The information handling system may map both the wellbore track (or "well path") and the voxels of resistivity measurements into the three-dimensional environment 404 according to a three-dimensional coordinate system. The user interface 400 may display the three-dimensional model 406 of resistivity data and the track image 410, and the user interface 400 may enable a user to rotate the three-dimensional environment 404 thereby changing the point of view on the display device while keeping the track image 410 and the three-dimensional model 406 in the same relative locations according to the coordinate system.

In certain aspects, the track image 410 representing the wellbore may be rendered for display in the three-dimensional environment 404 prior to the generation of the three-dimensional volume 402. In certain aspects, both the track image 410 representing the wellbore and the three-dimensional model 406 representing the resistivity measurements may be rendered for display in the three-dimensional environment 404 prior to the generation of the three-dimensional volume 402. The user interface 400 may show one or more of these components in the three-dimensional environment 404 and enable generation of a user defined three-dimensional volume 402. The information handling system may generate the user defined three-dimensional volume 402 in at least two ways: with and without dependency on the well path (e.g., represented by track image 410). The embodiments of FIGS. 4A-4G illustrate a user defined three-dimensional volume 402 without dependency on the well path, while the embodiments of FIGS. 5A-5F illustrate generation of a user defined three-dimensional volume 402 with dependency on the well path.

The user interface 400 may include one or more viewing selection options (not shown) for displaying the three-dimensional environment 404. For example, the user interface 400 may provide a home button that changes the view of the three-dimensional environment 404 to a preselected default view. The user interface 400 may include one or more options that cause the display to "fit to screen" the resistivity data shown in the three-dimensional environment. The user interface 400 may allow for split-screen viewing of multiple views of the same resistivity data and three-dimensional environment from different angles, scales, cross-sections, and so forth. The user interface 400 may enable a user to select one of a plurality of available segments of results of updating the resistivity model as additional measurements are taken during a drilling process, for example. The user interface 400 may also include a "save views" button that allow a user to selectively save any view of resistivity data in the three-dimensional environment so that the view does not need to be recreated at a later time for showing geo-steerers, customers, or other interested parties.

FIG. 4A illustrates the three-dimensional environment 404 as an example three-dimensional volume 402 is initially placed in the three-dimensional environment 404. The three-dimensional model 406 of resistivity data and the track image 410 may both be shown on the display prior to initial placement of the three-dimensional volume 402. This placement of a three-dimensional volume 402 may be initiated by a user selection of a three-dimensional primitive shape/volume available via a software application. For example, the user interface 400 may enable the selection of one or more pre-defined primitive shapes (e.g., cube, rectangular prism, pyramid, cone, cylinder, sphere, etc.) from a drop-down menu on a toolbar 412. In other embodiments, the user interface 400 may enable the user to define a different shape (e.g., an irregular shape) that is not pre-defined. For example, the user interface 400 may provide the user access to software tools (e.g., CAD based tools) that enable free-form drawing or building of a three-dimensional shape/volume within the three-dimensional environment 404. The three-dimensional volume 402 may initially be positioned at any location within the three-dimensional environment 404. For example, the three-dimensional volume 402 may be initially placed at a central location with respect to all three axes of the environment 404. In other embodiments, the three-dimensional volume 402 may be initially placed at a location corresponding to a point in the environment 404 most recently selected via a cursor 414. However, other initial placements may be used for the three-dimensional volume 402 upon the selection of the volume 402 by a user. In still other embodiments, the user may click and drag the three-dimensional volume 402 to any desired location using the cursor 414.

As illustrated, the three-dimensional volume 402 may be initially displayed as superimposed on any other renderings (e.g., model 406 of resistivity data) in the three-dimensional environment 404. In other embodiments, the model 406 of resistivity data may initially be hidden during generation of the user selected three-dimensional volume 402 and displaying the volume 402 on the display device.

Figure 4B:
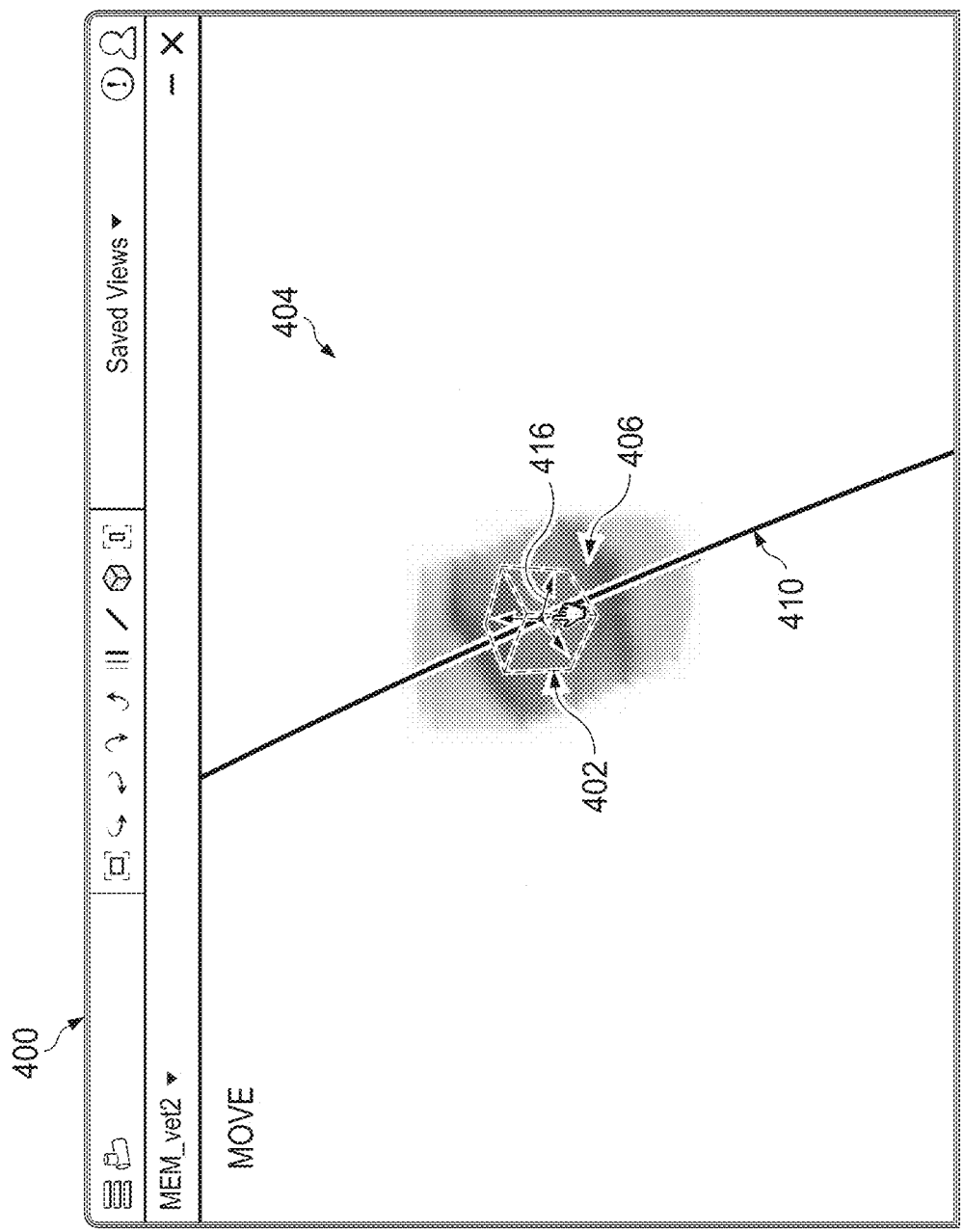
Figure 4C:
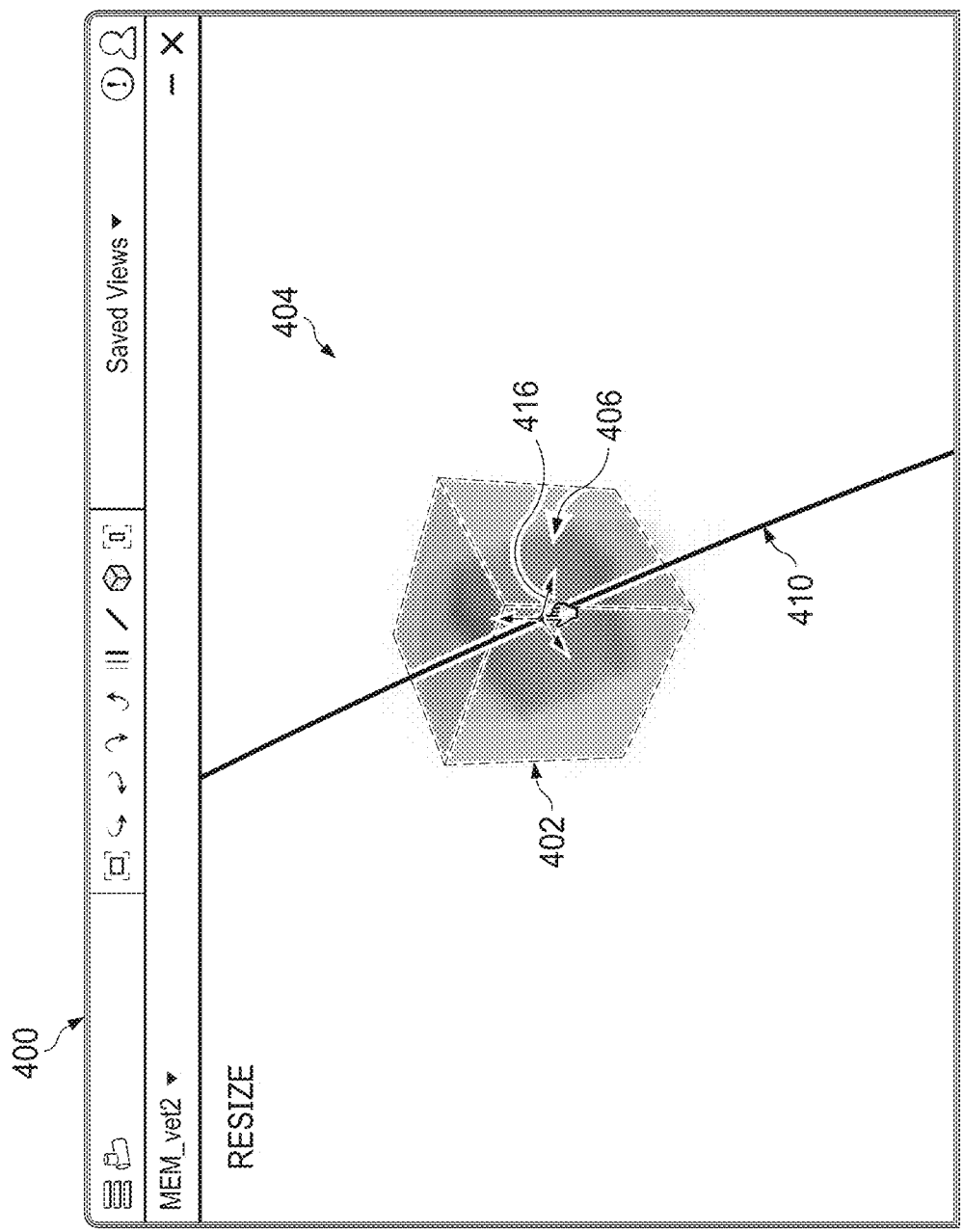
Figure 4D:
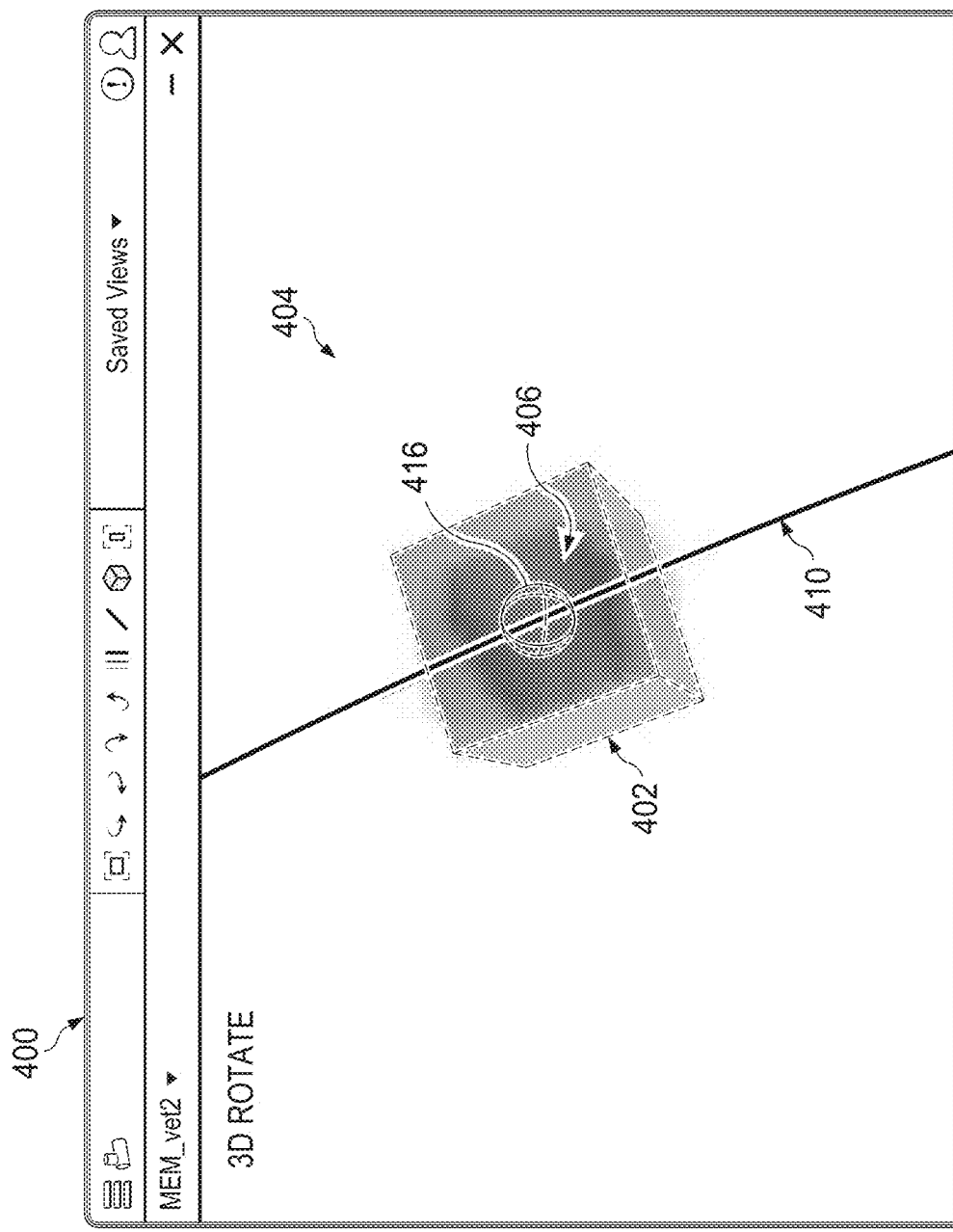
Figure 4E:
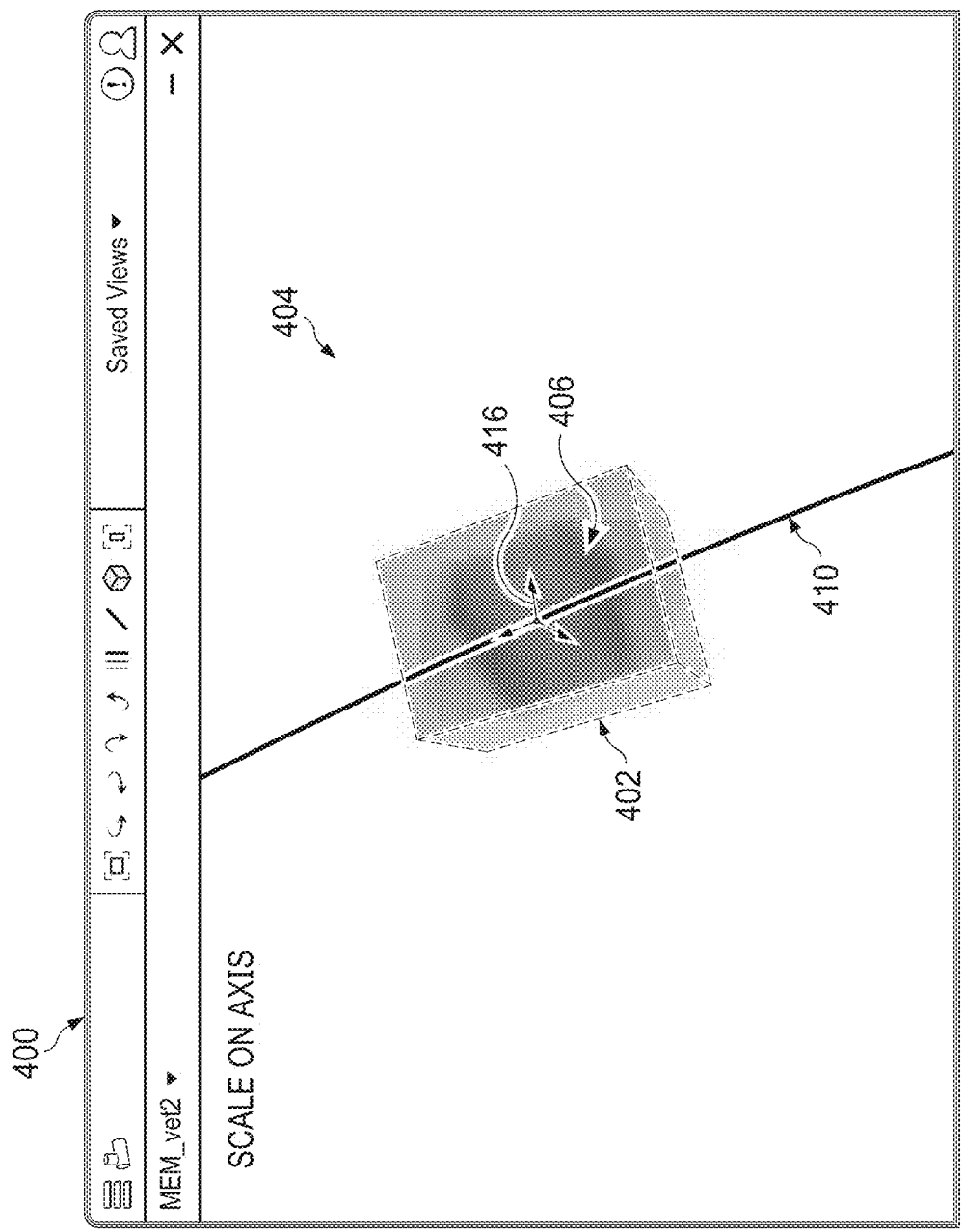

Once the initial three-dimensional volume 402 is placed in the environment 404, additional operations may be performed to adjust the dimensions and/or placement of the three-dimensional volume 402 in the environment 404. For example, a user may have the ability to move the three-dimensional volume 402 within the environment 404, as shown in FIG. 4B. In addition, a user may have the ability to scale all dimensions of the three-dimensional volume 402 up or down simultaneously. For example, as shown in FIG. 4C, the three-dimensional volume 402 may be scaled up to increase the dimension of each outer surface thereof by the same amount. In addition, a user may have the ability to rotate the volume 402 in three-dimensions, as shown in FIG. 4D. Three-dimensional rotation of the volume 402 in the environment 404 may involve assigning a first coordinate system (not shown) to the three-dimensional environment 404, a second coordinate system 416 to the three-dimensional volume 402, and rotating the entire volume 402 and its second coordinate system 416 with respect to the first coordinate system of the environment 404. As shown in FIG. 4E, a user may have the ability to scale the shape of the volume 402 along an axis (e.g., x-, y-, or z-axis) of the second coordinate system 416.

The three-dimensional volume 402 may be fully generated in FIG. 4E. As illustrated, the three-dimensional volume 402 may fully encompass the model 406 of resistivity measurement data. In other embodiments, the generated three-dimensional volume 402 may be smaller than a total volume of the model 406 of measured resistivity data. In such embodiments, the three-dimensional volume 402 may contain a subset of the voxels of resistivity data associated with a measured portion of the formation surrounding the wellbore. The user interface 400 may enable a user to hide all resistivity data of the model 406 that is not contained within the generated three-dimensional volume 402. Specifically, the colors associated with the resistivity measurements outside the user generated three-dimensional volume 402 may be removed of made translucent, leaving a visual model of the subset of resistivity data within the generated three-dimensional volume 402. The three-dimensional volume 402 is a clear visual representation of the resistivity field around the wellbore at a volume of interest in the formation. This clear visual representation of the resistivity field may reduce time, costs and risks associated with interpreting large amounts of three-dimensional resistivity data.

Figure 4F:
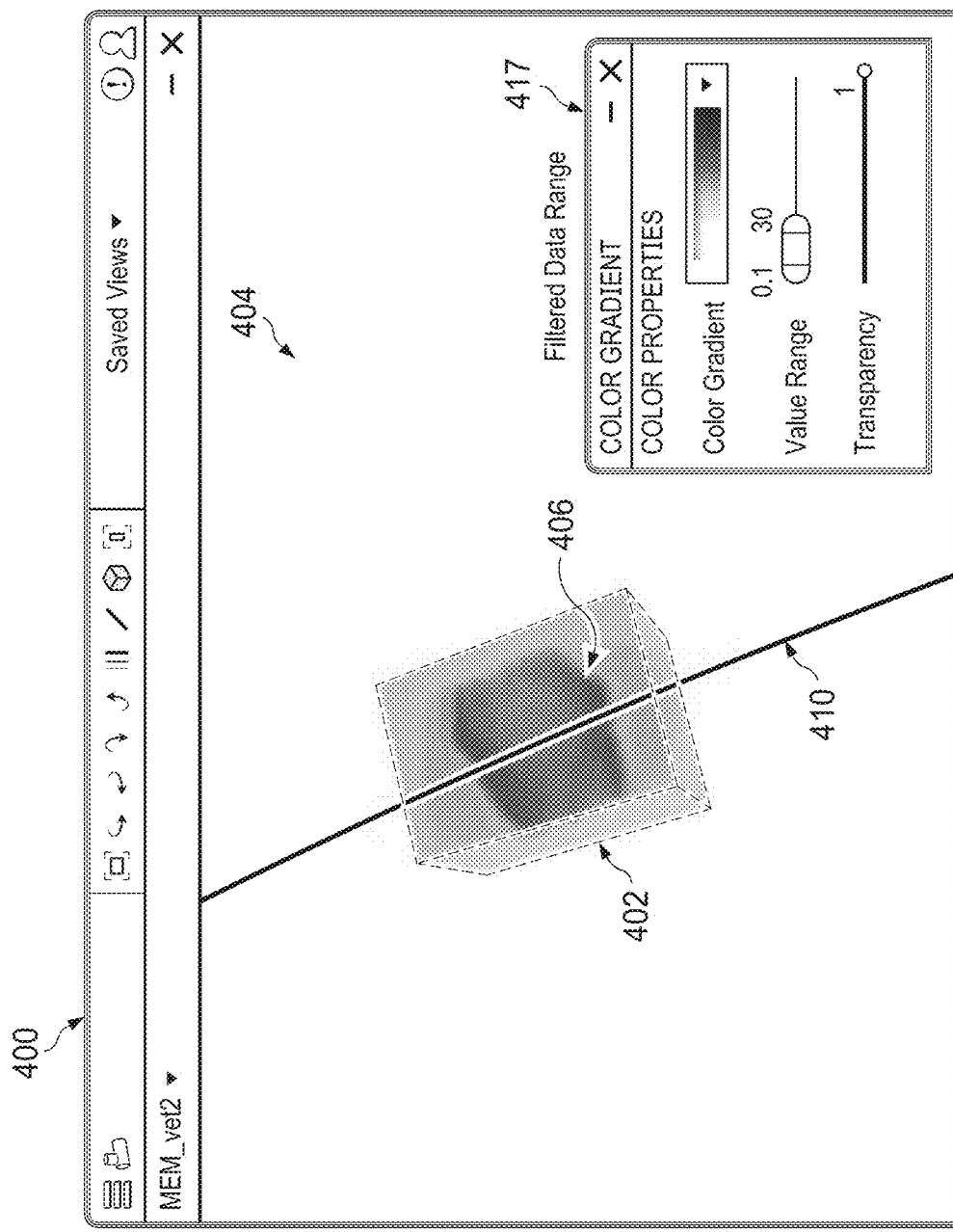
FIG. 4F illustrates an example filtered data set including filtered resistivity data subsets of the resistivity data corresponding to the location of the generated three-dimensional volume of FIG. 4E, in accordance with one or more aspects of the present disclosure.

Upon generating the three-dimensional volume 402 and hiding any resistivity data outside of the volume 402, a user may filter the resistivity data within the three-dimensional volume 402 based on one or more resistivity thresholds, as shown in FIG. 4F. For example, a user may selectively filter the resistivity data within the three-dimensional volume 402 to view one or more portions of the formation in a volume of interest around the wellbore having the highest 40%, 30%, or 20% resistivity values 417 and may steer a drilling tool in a direction of one of those one or more portions indicated as having the high resistivity values.

In certain aspects, upon generating the three-dimensional volume 402, the information handling system may perform one or more calculations on the subset of resistivity data within the volume 402. In certain aspects, the information handling system may perform one or more calculations on the filtered resistivity data within the volume 402 after filtering the subset of resistivity data in the volume 402. Such calculations may include, for example, a calculation of an estimated volume of hydrocarbon within the selected three-dimensional volume 402. Such calculations may also include, for example, a calculation of a percentage of or total amount of oil, water, or gas; an estimated monetary value of the hydrocarbon available in the reservoir; and/or an estimated profit for the wellbore (or section of wellbore) given the estimated monetary value and cost of performing associated well operations.

In one or more aspects, multiple measurement tools may be used within a wellbore in order to provide the user different types of information relating to geology and fluid saturation surrounding the wellbore. For example, the BHA may include several tools with different depths of investigation and types of measurements. In one or more aspects, in order to facilitate a more comprehensive analysis of the geology surrounding the wellbore, in addition to plotting three-dimensional sensor data collected by a well logging tool (e.g., resistivity, acoustic, NMR, or other logging tool) in a user selected volume as described above, additional data from one or more other tools may be used to further interpret the sensor data in the user selected three-dimensional volume.

Figure 4G:
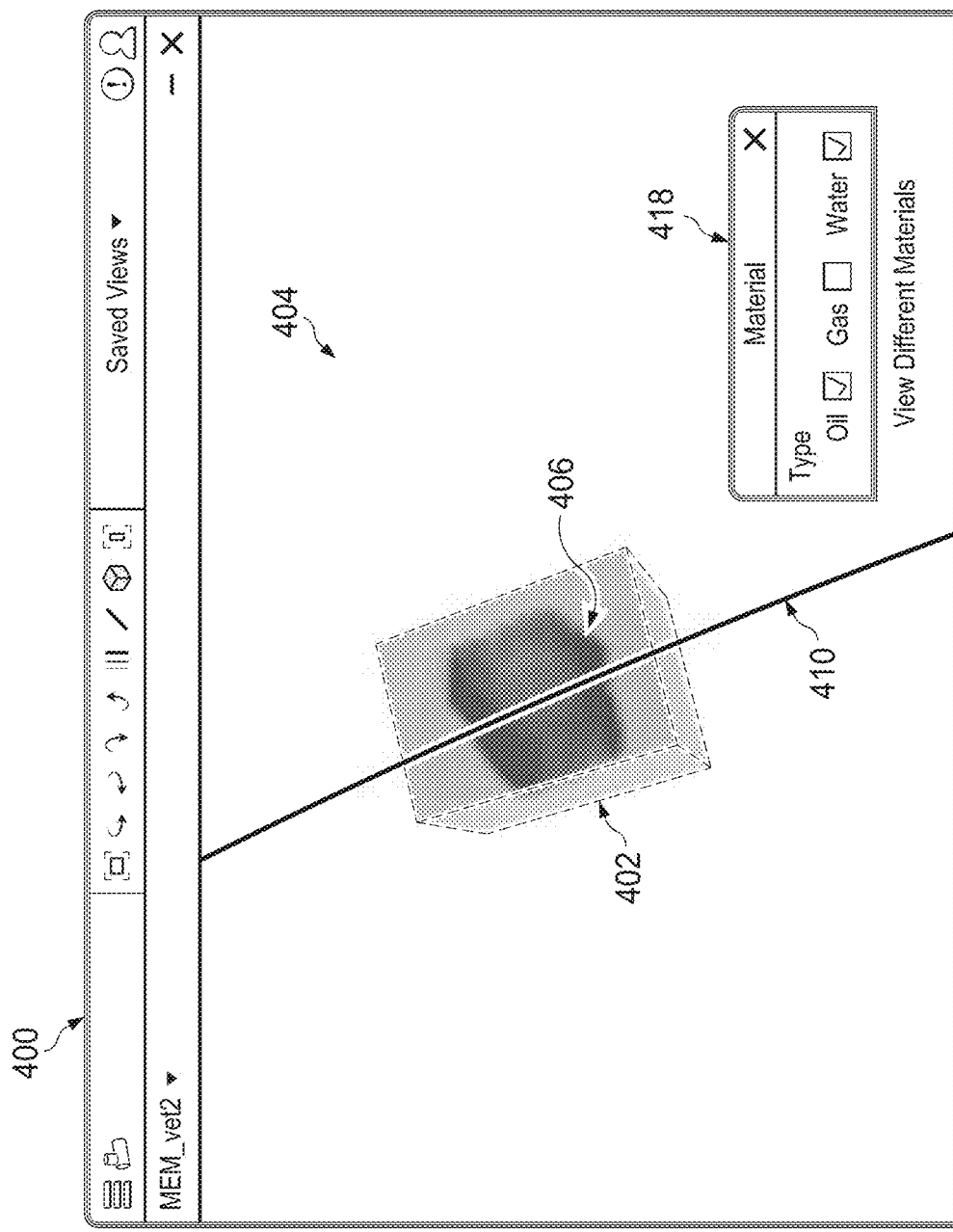
FIG. 4G illustrates an example filtered data set including resistivity data subsets of the resistivity data corresponding to the location of the generated three-dimensional volume of FIG. 4E and to one or more selected formation materials, in accordance with one or more aspects of the present disclosure.

In certain aspects, for example, the BHA may also include one or more tools for measuring/plotting neutron and density curves for the formation. When information regarding the neutron and density curves are available, the information handling system may assign one of a plurality of material types (e.g., oil, gas, or other) to each voxel in the subset of voxels corresponding to the user selected three-dimensional volume 402. In certain aspects, upon generating the three-dimensional volume 402, a user may selectively choose to hide or view the data corresponding to any of the material types (418) within the three-dimensional volume 402. For example, FIG. 4G illustrates an example filtered data set including resistivity data subsets of the resistivity data corresponding to the location of the generated three-dimensional volume 402 and to one or more selected formation materials (e.g., oil, gas, and water) 418, in accordance with one or more aspects of the present disclosure. This may enable a user to easily estimate oil or gas volumes and visualize these different materials within a volume of interest in the formation.

Figure 5A:
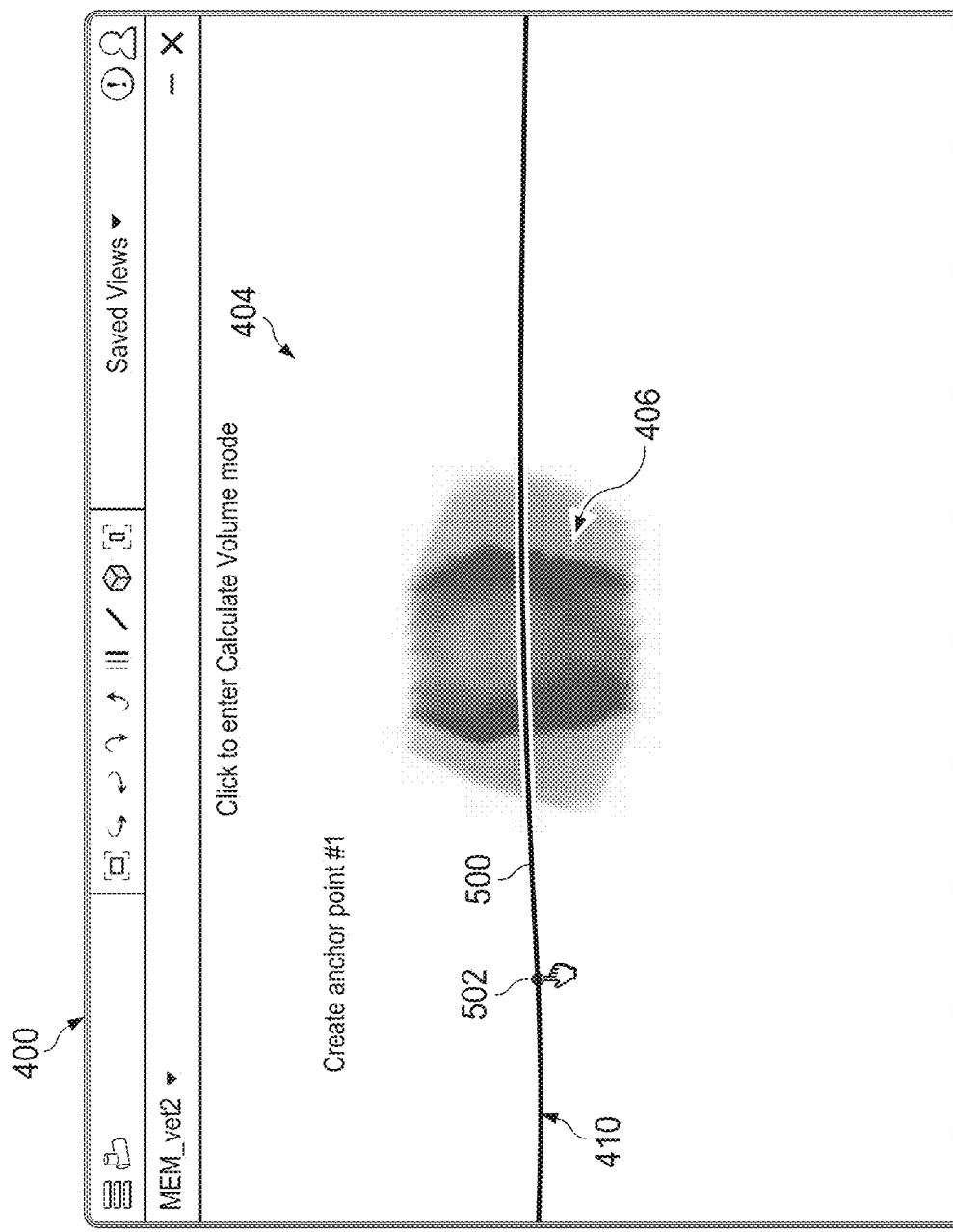
FIGS. 5A-5D illustrate an example data set of resistivity data in a three-dimensional environment and the generation of an example three-dimensional volume for display of resistivity data within the three-dimensional volume, in accordance with one or more aspects of the present disclosure.
Figure 5B:
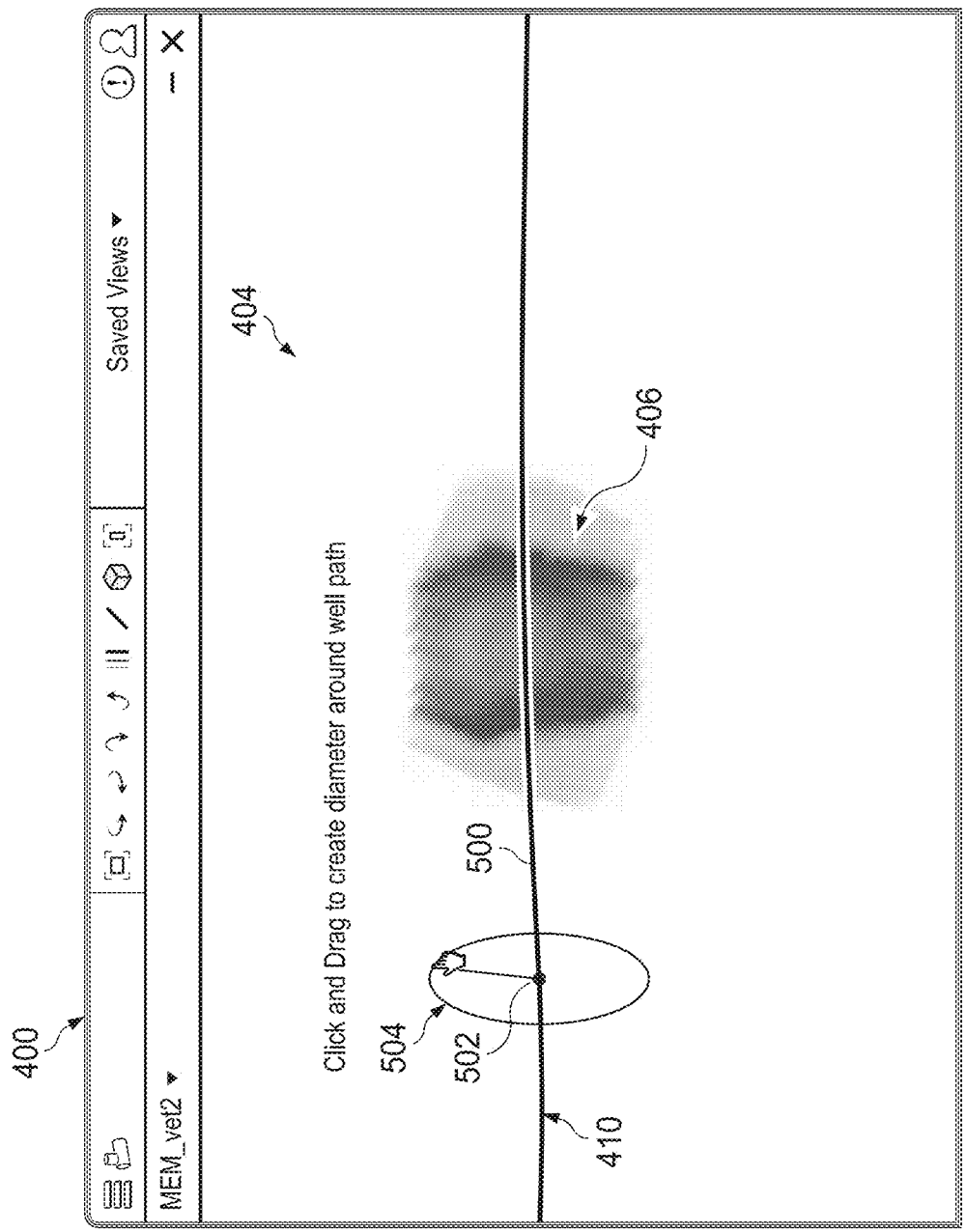
Figure 5C:
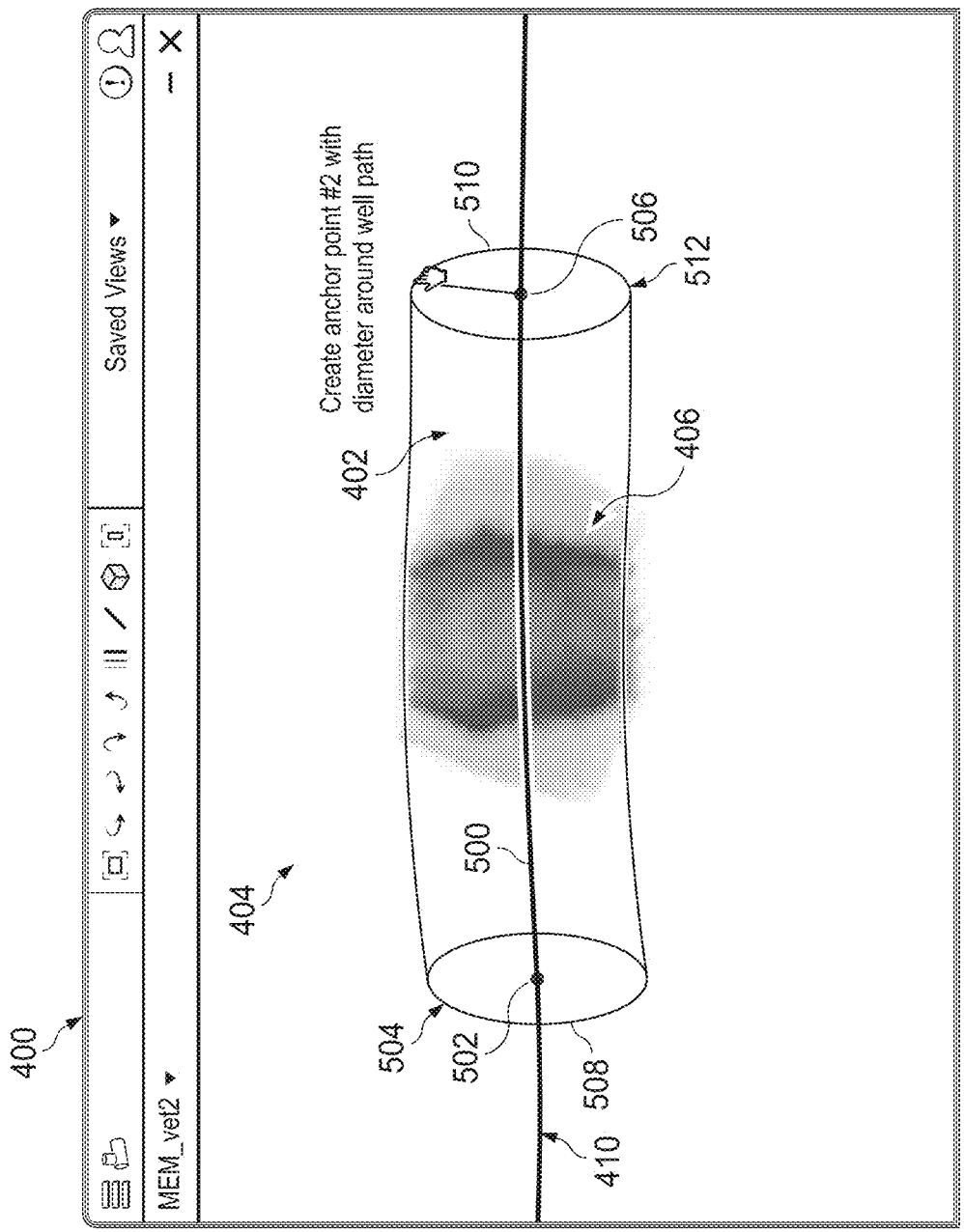

FIGS. 5A-5C illustrate the three-dimensional environment 404 as an example three-dimensional volume 402 is generated in the three-dimensional environment 404 based on user input. The three-dimensional model 406 of resistivity data and the track image 410 may both be shown on the display prior to generation of the three-dimensional volume 402. As mentioned above, FIGS. 5A-5C illustrate the generation of a three-dimensional volume 402 that is well path dependent, meaning that the three-dimensional volume 402 is generated with respect to and tied to a user selected portion of the well path 500. As shown in FIG. 5A, the user interface 400 may enable the selection of a first point 502 in the three-dimensional environment 404 on the well path 500 (e.g., illustrated via the track image 410) corresponding to a first location along a length of the wellbore (e.g., 16 of FIG. 1).

As shown in FIG. 5B, the user interface 400 may enable the user to select a first two-dimensional shape 504 in the three-dimensional environment 404, the two-dimensional shape 504 intersecting the first point 502. As illustrated, the two-dimensional shape 504 may be a circle. In other embodiments, one or more other shapes 504 may be selected by the user including, for example, a square, rectangle, trapezoid, ellipse, triangle, an irregular shape (e.g., a user drawn shape), or any other desired shape. In certain aspects, the two-dimensional shape 504 may be automatically centered with respect to the first point 502. In other aspects, the two-dimensional shape 504 may not be centered with respect to the first point 502. In certain aspects, the two-dimensional shape 504 may be in a two-dimensional plane perpendicular to a direction in which the wellbore extends at the location along its length corresponding to the first point 502. In other aspects, the two dimensional shape 504 may not be perpendicular to the direction of the well path 500 at the first point 502.

After generating the first two-dimensional shape 504, the user may select a second point 506 in the three-dimensional environment 404 on the well path 500, as shown in FIG. 5C. This second point 506 may correspond to a second location along the length of the wellbore (e.g., 16 of FIG. 1) different from the first location. The generated three-dimensional volume 402 is bound by at least the first point 502 and the first two-dimensional shape 504 on a first side 508 thereof, and the three-dimensional volume 402 is bound by at least the second point 506 on a second side 510 thereof.

In certain aspects, the information handling system may generate the three-dimensional dimensional volume 402 in FIG. 5C by generating a second two-dimensional shape 512 that intersects the second point 506, and then generating a three-dimensional volume 402 that is bound at least by the second point 506 and the second two-dimensional shape 512 at the second end 510. The generated second two-dimensional shape 512 may have the same size and shape as the first two-dimensional shape 504. In certain embodiments, the generated three-dimensional volume 402 is a cylindrical volume extending from the first point 502 to the second point 506 while following the well path 500 corresponding to the direction of the wellbore. However, other volume shapes may be generated in other embodiments. The information handling system may join the diameters (or other outer dimensions) of the opposing two-dimensional shapes 504 and 512, following the curve of the well path 500, as shown, to generate the three-dimensional volume 402.

In certain aspects, the information handling system may enable a user to select the second two-dimensional shape 512, which may be the same or different from the first two-dimensional shape 504. The information handling system may join the outer dimensions of the opposing user selected two-dimensional shapes 504 and 512 following the curve of the well path 500, as shown, to generate the three-dimensional volume 402. In one or more aspects, in order to generate the three-dimensional volume 402 the outer boundaries of the volume extending along the well path 500 are extrapolated between consecutive two-dimensional shapes (e.g., 504 and 512). A number, density or both of data points generating the boundary between the two-dimensional shapes may be selected based on a selected resolution.

Figure 5D:
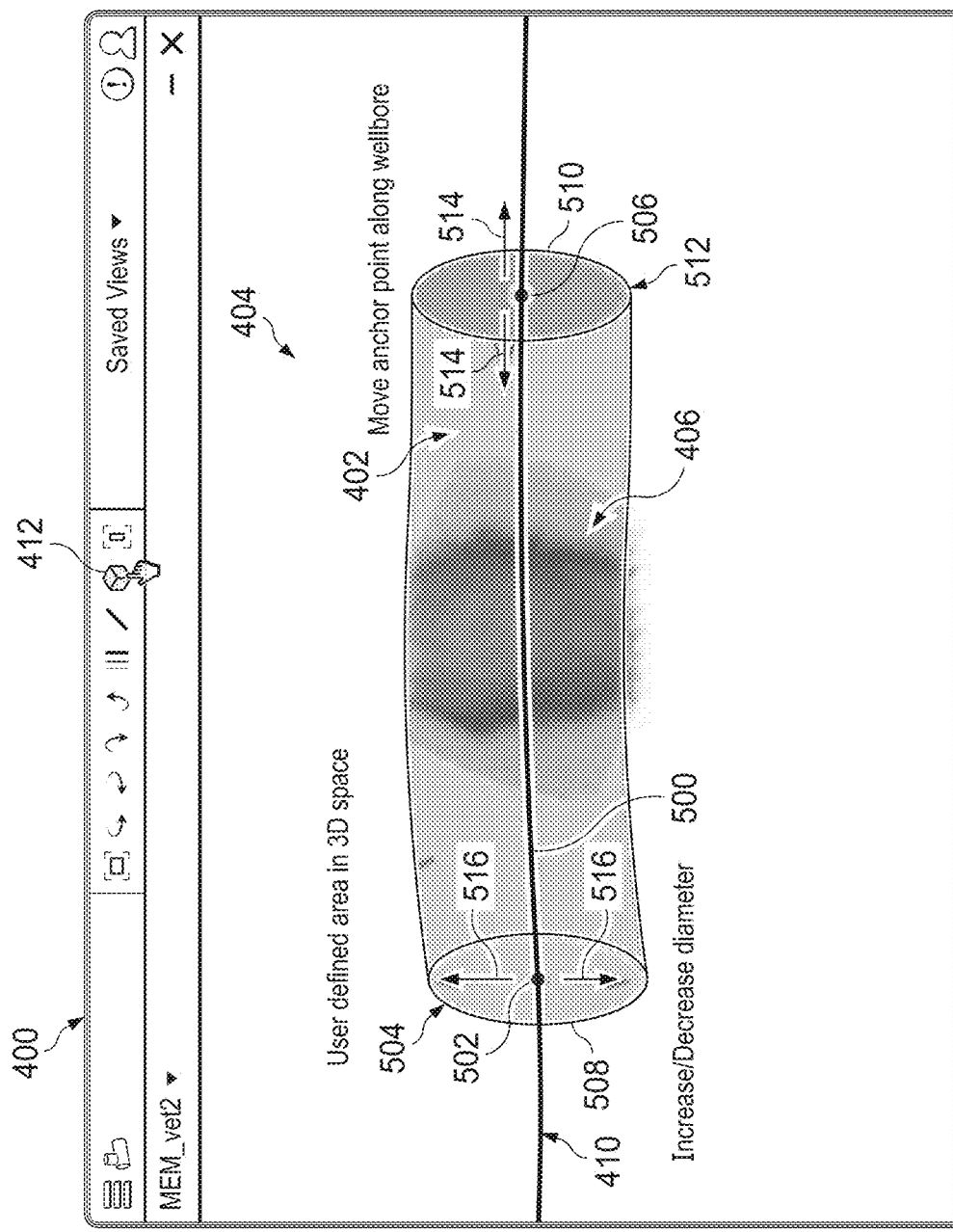

The information handling system may further enable a user to selectively change or adjust the three-dimensional volume 402 after its initial generation. For example, as shown in FIG. 5D, the three-dimensional volume 402 may be changed by adjusting the locations in the three-dimensional environment 404 of one or both points 502, 506 along the well path 500 (arrows 514), by adjusting the size, shape, or position of one or both of the two-dimensional shapes 504, 512 (arrows 516), or both. The information handling system automatically adjusts the three-dimensional volume 402 according to the user edits.

Although only two sets of points (502, 506) and corresponding two-dimensional shapes (504, 512) are shown in the embodiment of FIGS. 5A-5D, other embodiments of the user selected three-dimensional volume 402 may include additional points and corresponding two-dimensional shapes defined at the different points along the well path 500 between the first and second ends thereof to generate the desired three-dimensional volume 402. For example, other embodiments may generate the three-dimensional volume 402 based on three, four, five, six, seven, eight, or more points along the well path 500 and corresponding two-dimensional shapes intersecting these points. In some embodiments, a user may select two or more of the points (e.g., 502, 506) along the well path 500 and one or more of the two-dimensional shapes (e.g., 504), while the information handling system may generate any remaining points along the well path 500 and corresponding two-dimensional shapes connecting the user selections.

As illustrated, the three-dimensional volume 402 may be initially displayed as superimposed on any other renderings (e.g., model 406 of resistivity data) in the three-dimensional environment 404. In other embodiments, the model 406 of resistivity data may initially be hidden during generation of the use selected three-dimensional volume 402 and displaying the volume 402 on the display device.

As illustrated in FIG. 5D, the three-dimensional volume 402 may fully encompass the model 406 of resistivity measurement data. In other embodiments, the generated three-dimensional volume 402 may be smaller than a total volume of the model 406 of measured resistivity data. In such embodiments, the three-dimensional volume 402 may contain a subset of the voxels of resistivity data associated with a measured portion of the formation surrounding the wellbore. The user interface 400 may enable a user to hide all resistivity data of the model 406 that is not contained within the generated three-dimensional volume 402. Specifically, the colors associated with the resistivity measurements outside the user generated three-dimensional volume 402 may be removed or made translucent, leaving a visual model of the subset of resistivity data within the generated three-dimensional volume 402. The three-dimensional volume 402 is a clear visual representation of the resistivity field around the wellbore at a volume of interest in the formation. This clear visual representation of the resistivity field may reduce time, costs and risks associated with interpreting large amounts of three-dimensional resistivity data.

Figure 5E:
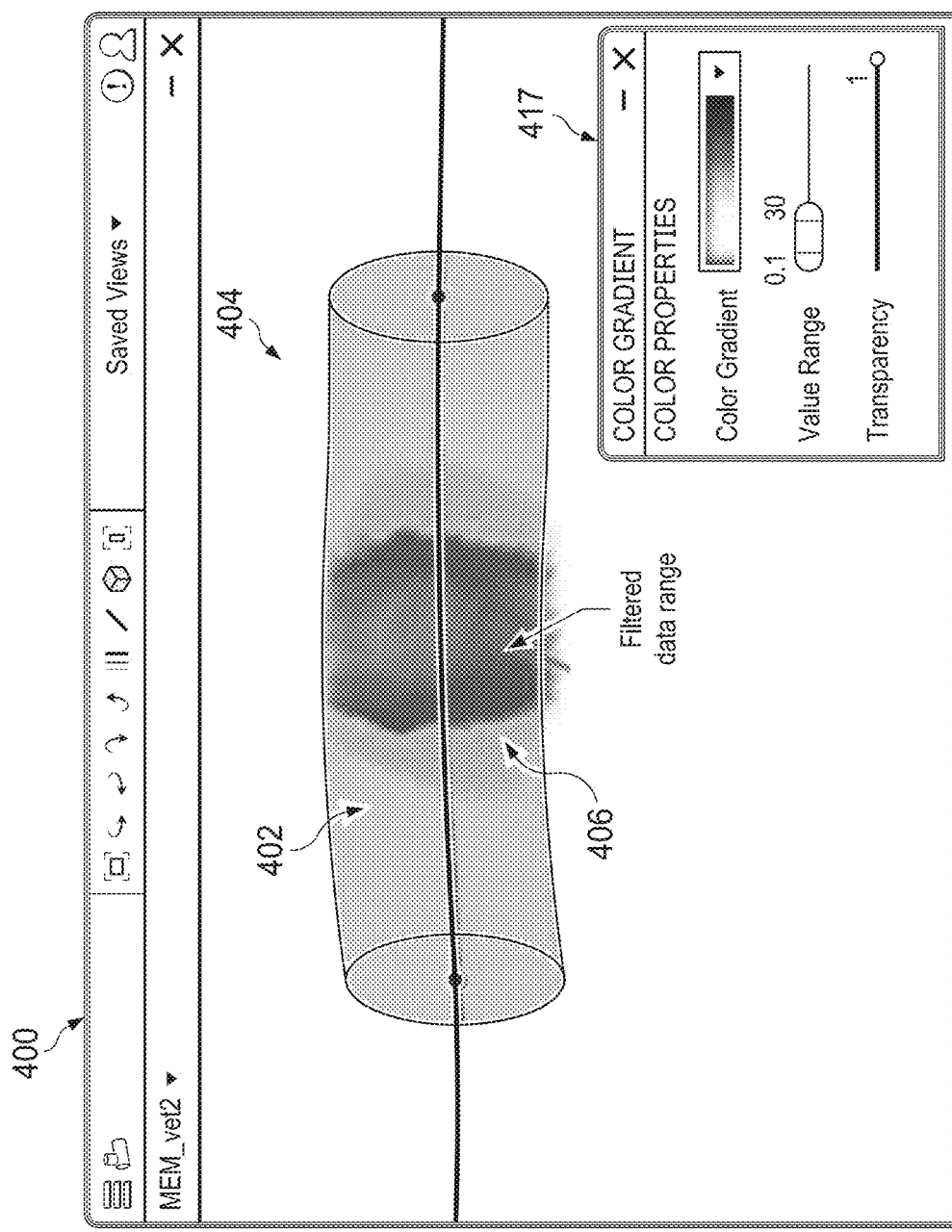
FIG. 5E illustrates an example filtered data set including filtered resistivity data subsets of the resistivity data corresponding to the location of the generated three-dimensional volume of FIG. 5C, in accordance with one or more aspects of the present disclosure.

Upon generating the three-dimensional volume 402 and hiding any resistivity data outside of the volume 402, a user may filter the resistivity data within the three-dimensional volume 402 based on one or more resistivity thresholds, as shown in FIG. 5E. For example, a user may selectively filter the resistivity data within the three-dimensional volume 402 to view one or more portions of the formation in a volume of interest around the wellbore having the highest 40%, 30%, or 20% resistivity values 417 and may steer a drilling tool in a direction of one of those one or more portions indicated as having the high resistivity values.

In certain aspects, upon generating the three-dimensional volume 402, the information handling system may perform one or more calculations on the subset of resistivity data within the volume 402. In certain aspects, the information handling system may perform one or more calculations on the filtered resistivity data within the volume 402 after filtering the subset of resistivity data in the volume 402. Such calculations may include, for example, a calculation of an estimated volume of hydrocarbon within the selected three-dimensional volume 402. Such calculations may also include, for example, a calculation of a percentage of or total amount of oil, water, or gas; an estimated monetary value of the hydrocarbon available in the reservoir; and/or an estimated profit for the wellbore (or section of wellbore) given the estimated monetary value and cost of performing associated well operations.

Figure 5F:
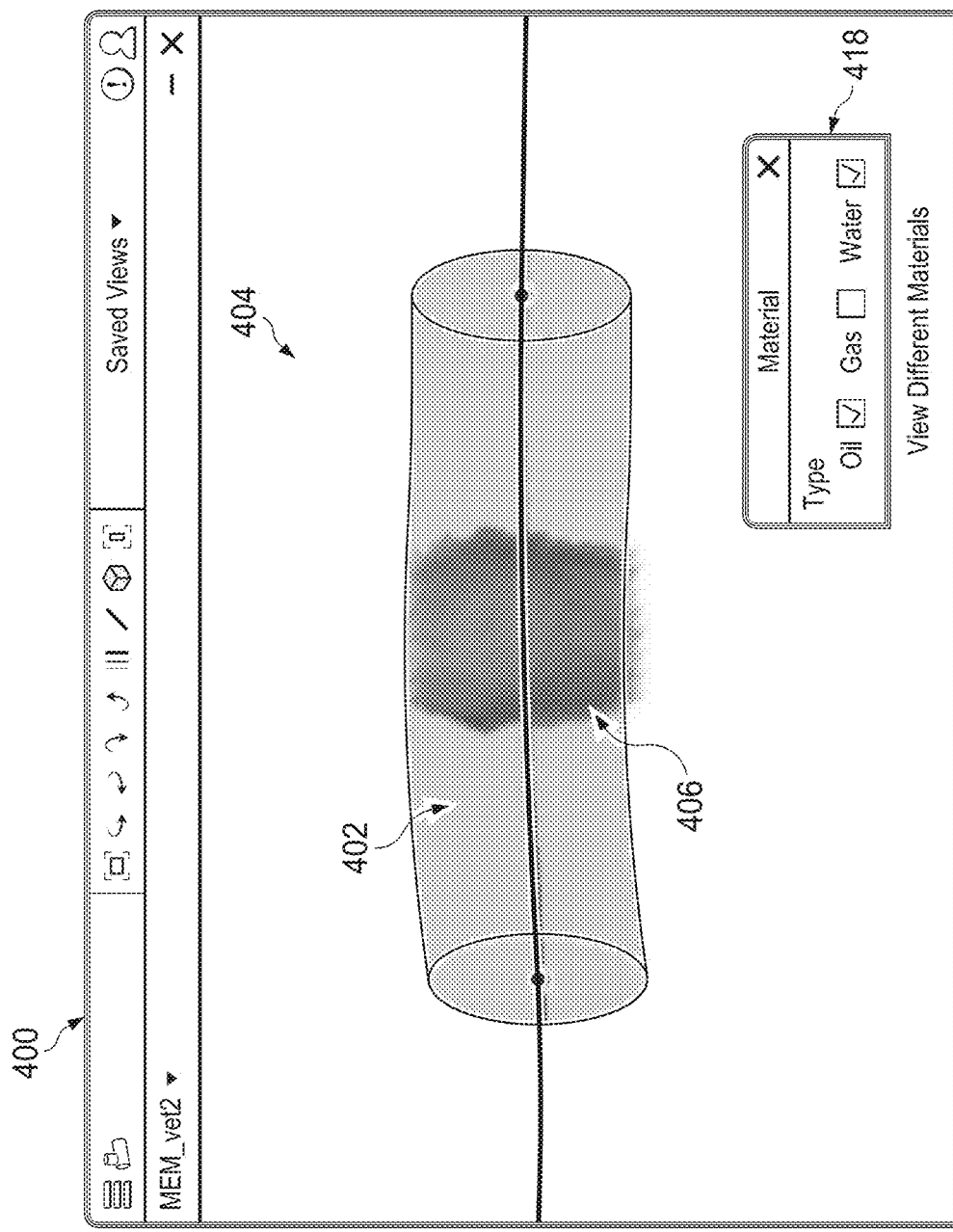
FIG. 5F illustrates example filtered data set including resistivity data subsets of the resistivity data corresponding to the location of the generated three-dimensional volume of FIG. 5C and to one or more selected formation materials, in accordance with one or more aspects of the present disclosure.

When information regarding the neutron and density curves are available, the information handling system may assign one of a plurality of material types (e.g., oil, gas, water, or other) to each voxel in the subset of voxels corresponding to the user selected three-dimensional volume 402. In certain aspects, upon generating the three-dimensional volume 402, a user may selectively choose to hide or view the data corresponding to any of the material types (418) within the three-dimensional volume 402. For example, FIG. 5F illustrates an example filtered data set including resistivity data subsets of the resistivity data corresponding to the location of the generated three-dimensional volume 402 and to one or more selected formation materials 418 (e.g., oil, gas, and water), in accordance with one or more aspects of the present disclosure. This may enable a user to easily estimate oil or gas volumes and visualize these different materials within a volume of interest in the formation.

Figure 6A:
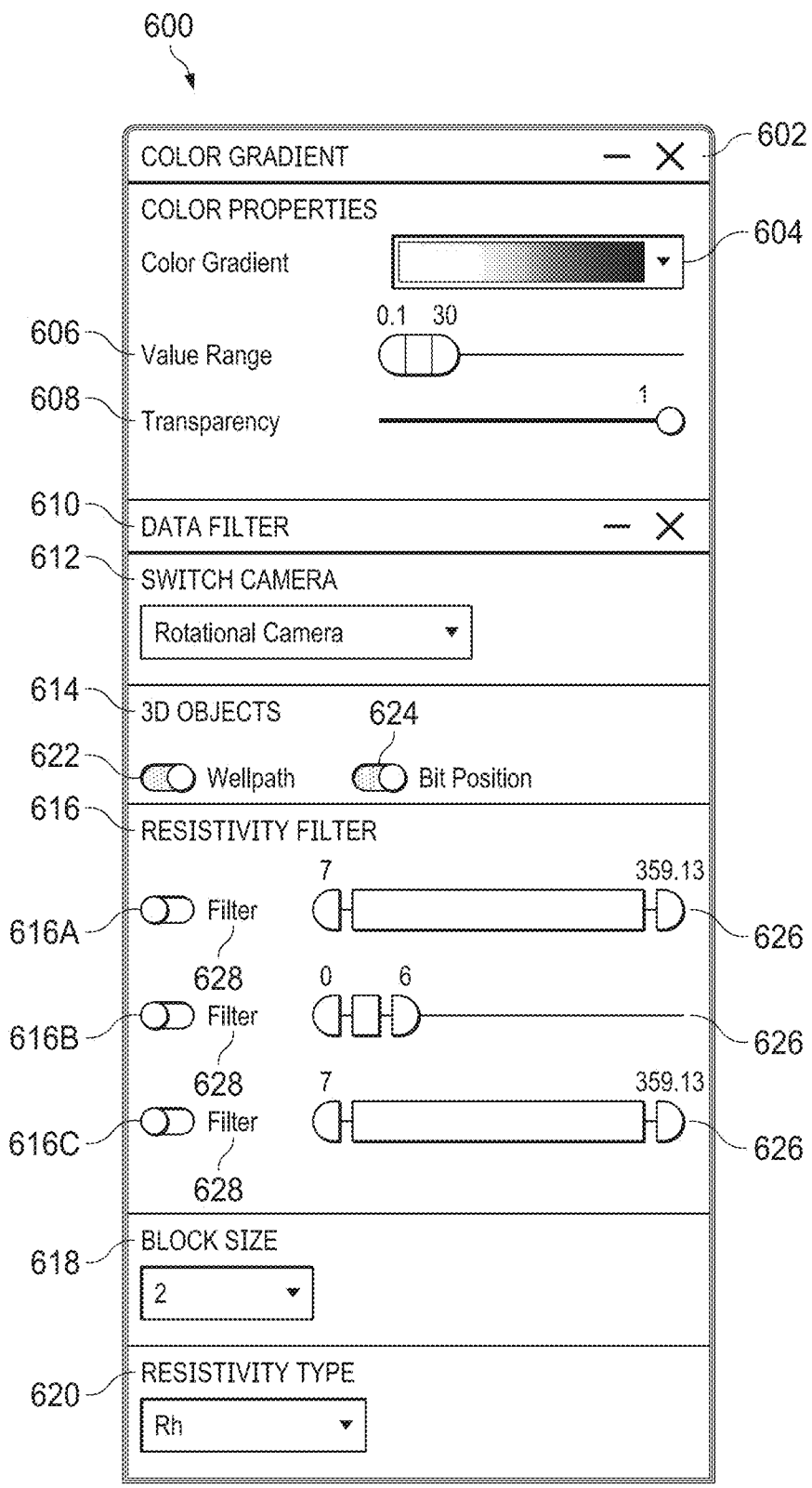
FIGS. 6A-6B illustrate an example list of filter settings available for use in filtering a data set of well log data (e.g., resistivity data) associated with a formation, in accordance with one or more aspects of the present disclosure.
Figure 6B:
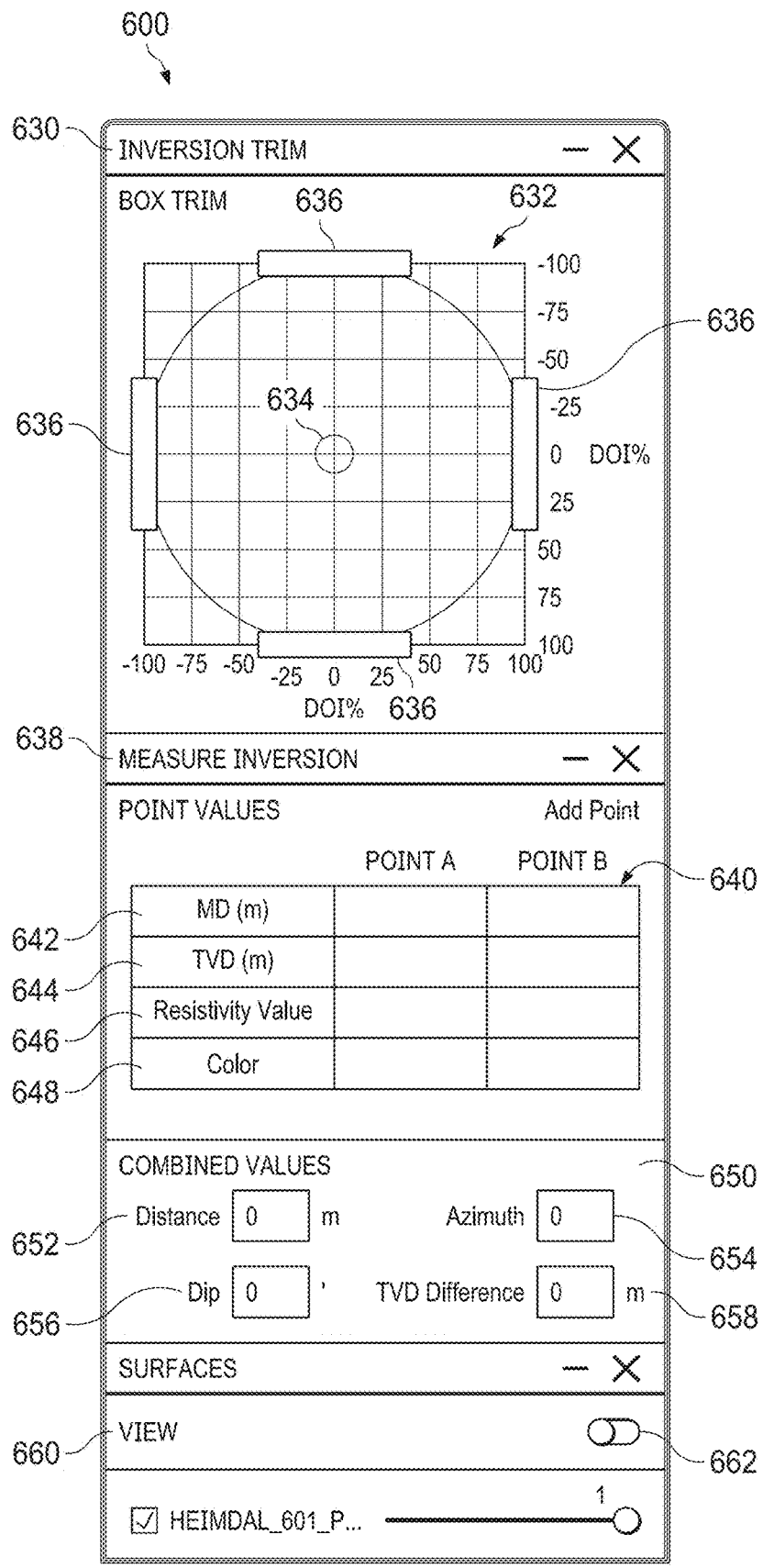

FIGS. 6A and 6B illustrate an example list of filter settings 600 that may be used to filter the sensor data (e.g., resistivity, acoustic, NMR, or other data) within the generated three-dimensional volumes (e.g., 402) described above with reference to FIGS. 4A-5F. As illustrated, the list of filter settings may be organized as a drop-down menu or toolbar displayed on a user interface (e.g., 400 of FIGS. 4A-5F). The toolbar and above described rendered three-dimensional environment may be displayed beside one another on the same display. The toolbar may enable a user to make one or more selections from the list of filter settings 600, and these one or more selected filter settings 600 may be automatically applied to the sensor data within the three-dimensional volume that was previously selected by the user. The filter settings 600 may include one or more settings regarding how the three-dimensional sensor data set is to be filtered, one or more settings regarding how the filtered data set is to be displayed, or a combination thereof. It should be noted that other methods for displaying and/or organizing the list of filter settings 600 of FIGS. 6A and 6B and allowing an operator to make selections may be used in other embodiments, as will be apparent to a person of ordinary skill in the art. In addition, other embodiments may include different numbers, types, or combinations of filter settings 600 that may be selectively applied to the three-dimensional sensor data.

In the illustrated embodiment of FIGS. 6A and 6B, the measurement being filtered is resistivity. However, it should be noted that other types of three-dimensional sensor data (e.g., acoustic data, NMR data, or other parameters measured via downhole logging devices) may be similarly filtered on a user interface. The following description, while discussing the filtering and interpretation of resistivity data in particular, may be applied similarly to all other types of three-dimensional sensor data that may be collected during well logging and other operations.

As shown in FIG. 6A, the filter settings 600 may include, for example, one or more color gradient settings 602. The color gradient settings 602 may include, for example, a color gradient 604, a value range 606 for the color gradient, and/or a transparency 608 for the color gradient. The color gradient 604 may provide a drop-down menu from which a user can select a desired color gradient (e.g., range of colors) that will be used in displaying the range of filtered data. A user may select a color gradient 604 from a finite number of available gradient options (e.g., violet to red, black to white, dark pink to light pink, etc.). Additionally, or alternatively, the user may be able to select a customized color gradient by selecting a first color to represent a lower end of the filtered resistivity range and a second color to represent an upper end of the filtered resistivity range, and the computer program may generate the customized color gradient transitioning between the two selected colors. The color gradient 604 provides the range of colors in which the filtered data set may be displayed.

The value range 606 may enable filtering of the resistivity data set in the three-dimensional volume (e.g., 402 of FIGS. 4A-5F) by resistivity value. As illustrated, the value range 606 may be displayed as a slider bar that enables a user to set the upper and/or lower bounds of resistivity values to be displayed for the generated three-dimensional volume (e.g., 402). The transparency 608 may provide for adjusting the transparency of the filtered data set being illustrated within the generated three-dimensional volume (e.g., 402). For example, the filtered data set may be illustrated as fully opaque if the transparency is set to 1, and/or the filtered data set may not be shown (or may be nearly transparent) if the transparency is set to 0. Adjusting these various color gradient settings 602 in combination with the generated three-dimensional volume (e.g., 402) may enable the system to generate a more visually clear and/or aesthetically pleasing display of filtered resistivity inversion data for consideration in making geosteering recommendations.

As shown in FIG. 6A, the filter settings 600 may include, for example, one or more data filter settings 610. The data filter settings 610 may include, for example, a camera setting 612, a 3D objects selection 614, one or more resistivity filters 616, block size 618, and resistivity type 620. The camera setting 612 may include a drop-down menu that allows a user to select one of multiple available types of camera settings with which to view the resistivity data. The camera setting 612 enables a user to switch between any desired type of camera settings such as, for example, a Rotational Camera. Other types of cameras for viewing the display of the three-dimensional environment will be apparent to those of skill in the art.

The 3D objects selection 612 may enable a user to toggle on/off a display of one or both of a well path 622 (e.g., track image 410) shown in the three-dimensional environment and a bit position 624 shown in the three-dimensional environment. As discussed above, the well path 622 may be displayed as a track image (e.g., 410 of FIGS. 4A-5F) or line extending along the path of the well through three-dimensional space. The bit position 624 may be displayed as a circular or spherical shape located where the drill bit is positioned along a length of the well path in three-dimensional space.

The resistivity filter(s) 616 may include one or more operator set resistivity value-based filters that may be selected for display. In the illustrated embodiment, the resistivity filter(s) contains three separate filters 616A, 616B, and 616C, although other numbers of filters may be provided and/or preset in other embodiments. The resistivity filter(s) 616 may enable a user to toggle on/off a display of one or more different filtered data sets. The upper and lower bounds of resistivity values 626 may be set for each of the filter(s) 616, as well as specific names 628 for the filter(s) 616. For example, in some embodiments, the filters 616A, 616B, and 616C may each be set to a range of resistivity values that represents a particular type of formation material, such as oil, gas, and water. The filters may be named "oil," "gas," and "water" based on their selected resistivity value ranges. This allows a user to easily toggle between displaying the different types of materials in the formation as represented based on the resistivity data in the generated three-dimensional volume (e.g., 402).

The block size 618 may be used to set a desired block size for the voxels of resistivity data being displayed in the generated three-dimensional volume (e.g., 402). Different block sizes 618 may be selected from a drop-down menu. Larger block sizes may generally represent larger three-dimensional voxels, which yield grainier and courser displays of the variation in resistivity throughout the three-dimensional volume. Smaller block sizes may generally represent smaller three-dimensional voxels, which yield smoother and finer displays of the variation in resistivity throughout the volume. For example, a block size 618 of "2," as shown, may provide a representation of the filtered data set with finer or smoother transitions between portions of the three-dimensional volume having different resistivity values compared to a block size of "4" or "8." The resistivity type 620 may represent the type of resistivity data being analyzed and used to form the inversion. A user may be able to select between $R_h$ (horizontal resistivity), $R_v$ (vertical resistivity), or ratio ($R_v/R_h$ ratio).

As shown in FIG. 6B, the filter settings 600 may further include, for example, an inversion trim setting 630 that enables a user to filter the resistivity data in the generated three-dimensional volume (e.g., 402) further based on spatial proximity to the well path. For example, as illustrated, the inversion trim setting 630 may provide a two-dimensional representation 632 of where the inversion data is available in an area extending in all radial directions from the well path 634 (represented at the origin 0,0 of the graph). The inversion trim setting 630 may allow a user to selectively trim the outer boundaries of the two-dimensional representation of the resistivity data, thereby filtering the data in the three-dimensional volume (e.g., 402) to show a slice of the data extending parallel to the length of the well path. For example, in the illustrated embodiment, the inversion trim setting 630 may include four bars 636 representing four edges of the quadrant in which the two-dimensional representation of the resistivity data is shown. These bars 636 may each be selectively movable to trim the resistivity inversion data being displayed in the three-dimensional volume (e.g., 402) so that an inner portion of the resistivity data may be more closely visualized and/or examined.

As shown in FIG. 6B, the filter settings 600 may also include, for example, an inversion measurement portion 638 that allows a user to easily select a point in the displayed resistivity data for performing one or more measurements thereon. A user may select (e.g., by clicking) a point within the three-dimensional volume (e.g., 402) displayed on the display, and the closest point in the inversion data may be automatically identified. The resistivity value and other data associated with this selected point may be populated in a point values table 640 shown on the display. This point values table 640 may include, for each selected point, a measured depth (MD) 642 of the selected point in meters, a true vertical depth (TVD) 644 of the selected point in meters, a resistivity value 646 at the selected point, and a color 648 from the color gradient associated with the selected point. A user may select one or more points for displaying the data associated therewith in the point values table 640. When two or more points are selected, one or more combined values 650 associated with these two selected points may be listed as well. The combined values 650 may include, for example, a total three-dimensional distance 652 (in meters) between the two selected points, an azimuthal angle 654 of the second selected point with respect to the first selected point taken in a direction azimuthally around an axis of the well path, a dip angle 656 of the second selected point with respect to the first selected point taken in a direction with respect to vertical, a TVD difference 658 (in meters) between the two selected points in the vertical direction, among others.

As shown in FIG. 6B, the filter settings 600 may also include a surfaces feature 660 that enables a user to view one or more surfaces with the resistivity inversion data. The one or more surfaces may be imported from another application, and a user is able to toggle the view 662 to allow the one or more imported surfaces to be displayed with the resistivity data in the generated three-dimensional volume (e.g., 402).

Figure 7:
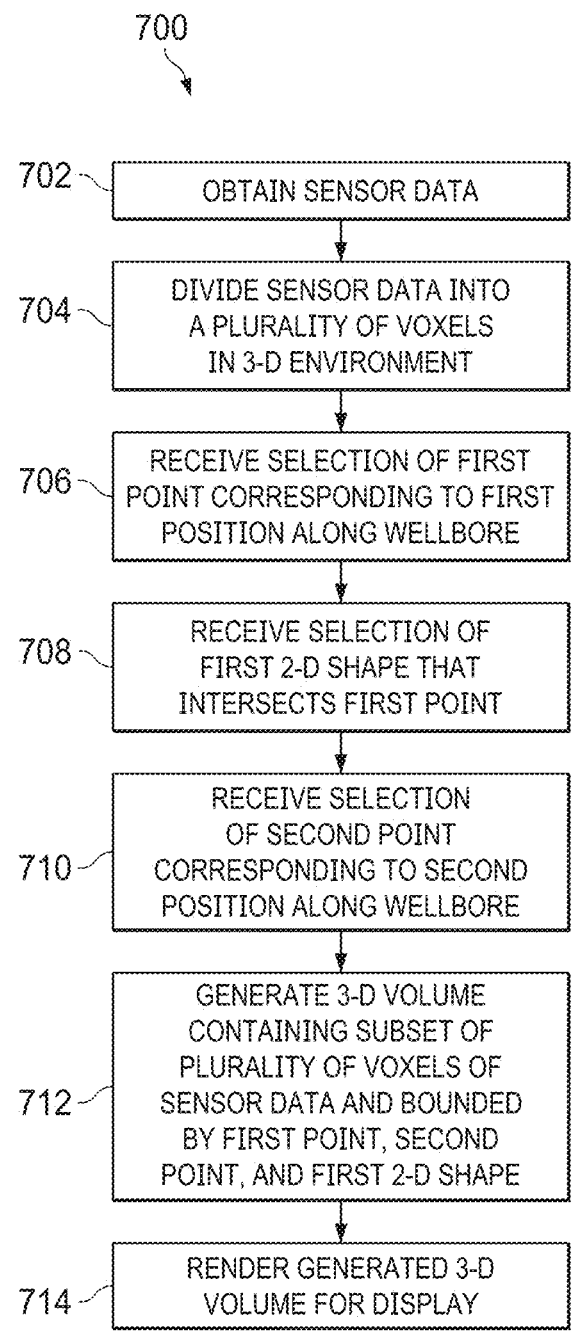
FIG. 7 illustrates example operations that may be performed by a data processing system for processing logged data associated with a formation, in accordance with one or more aspects of the present disclosure.

FIG. 7 illustrates example operations 700 that may be performed by a data processing system (for example, data processing systems 45 and 50) for processing sensor data (e.g., resistivity, acoustic, NMR, or other collected data) associated with a formation, in accordance with certain aspects of the present disclosure.

Operations 700 begin, at 702 by obtaining the sensor data relating to one or more measurement values of the formation proximate to a wellbore.

At 704, the sensor data is divided into a plurality of voxels in a three-dimensional environment, each voxel corresponding to a location in the formation surrounding the wellbore.

At 706, a selection of a first point in the three-dimensional environment corresponding to a first position along a length of the wellbore is received.

At 708, a selection of a first two-dimensional shape in the three-dimensional environment is received. The first two-dimensional shape intersects the first point.

At 710, a selection of a second point within the three-dimensional environment corresponding to a second position different from the first position along the length of the wellbore is received.

At 712, a three-dimensional volume is generated containing a subset of the plurality of voxels of sensor data associated with a portion of the formation surrounding the wellbore. The three-dimensional volume is bound at least by the first point and the first two-dimensional shape at a first end and by the second point at a second end opposite the first end.

At 714, the generated three-dimensional volume is rendered for display as an output on a display, wherein the three-dimensional volume displays the sensor data associated with the portion of the formation surrounding the wellbore.

In one or more aspects, any one or more of operations 700 may be performed in any order or not all.

In one or more aspects, the sensor data is resistivity data relating to one or more formation resistivities of the formation proximate to the wellbore.

In one or more aspects, operations 700 further include displaying a track image representing the wellbore on the display prior to receiving the selections of the first point and the second point, wherein the first point and the second point are points along the track image.

In one or more aspects, operations 700 further include orienting the two-dimensional shape in the three-dimensional environment such that the two-dimensional shape is perpendicular to a first direction corresponding to an axial direction of the wellbore at the first position.

In one or more aspects, the first two-dimensional shape is centered with respect to an axis corresponding to the axial direction of the wellbore at the first position.

In one or more aspects, the two-dimensional shape is a circle and the three-dimensional volume is a cylindrical volume extending from the first point to the second point following a path corresponding to a direction of the wellbore.

In one or more aspects, operations 700 further include receiving a selection of a second two-dimensional shape in the three-dimensional environment, the second two-dimensional shape intersecting the second point, wherein the three-dimensional volume is bound at least by the second point and the second two-dimensional shape at the second end.

In one or more aspects, generating the three-dimensional volume includes generating a second two-dimensional shape that intersects the second point, the three-dimensional volume being bound at least by the second point and the second two-dimensional shape at the second end.

In one or more aspects, operations 700 further include: filtering the sensor data in the subset of the plurality of voxels as a function of one or more measurement values associated with the sensor data or a range of measurement values associated with the sensor data; and rendering the generated three-dimensional volume for display, wherein the three-dimensional volume displays the filtered sensor data.

In one or more aspects, operations 700 further include: assigning, for each voxel of sensor data in the subset, a material type corresponding to one of a plurality of materials making up the portion of the formation surrounding the wellbore; receiving a selection to hide or show one or more of the material types; and updating the rendered three-dimensional volume output on the display to hide or show each voxel in the three-dimensional volume corresponding to the one or more material types.

In one or more aspects, operations 700 further include: receiving a selection to move the first point or the second point within the three-dimensional environment to a location corresponding to a third position along the length of the wellbore; in response to the selection to move the first point or the second point, updating the three-dimensional volume to contain a second subset of the plurality of voxels of sensor data, the updated three-dimensional volume bounded by the moved first or second points; and rendering the updated three-dimensional volume for display as an output on the display.

In one or more aspects, operations 700 further include: receiving a selection to adjust a shape of the first two-dimensional shape within the three-dimensional environment; in response to the selection to adjust the shape of the first two-dimensional shape, updating the three-dimensional volume to contain a second subset of the plurality of voxels of sensor data, the updated three-dimensional volume bounded by the adjusted first two-dimensional shape; and rendering the updated three-dimensional volume for display as an output on the display.

One or more aspects of the present disclosure provide an apparatus for processing sensor data associated with a formation. The apparatus generally includes a non-transitory storage medium and at least one processor coupled to the non-transitory storage medium. The at least one processor executes one or more instructions stored on the non-transitory storage medium to: obtain the sensor data relating to one or more measurement values of the formation proximate to a wellbore; divide the sensor data into a plurality of voxels in a three-dimensional environment, each voxel corresponding to a location in the formation surrounding the wellbore; receive a selection of a first point in the three-dimensional environment corresponding to a first position along a length of the wellbore; receive a selection of a first two-dimensional shape in the three-dimensional environment, the first two-dimensional shape intersecting the first point; receive a selection of a second point within the three-dimensional environment corresponding to a second position different from the first position along the length of the wellbore; generate a three-dimensional volume containing a subset of the plurality of voxels of sensor data associated with a portion of the formation surrounding the wellbore, the three-dimensional volume being bound at least by the first point and the first two-dimensional shape at a first end and by the second point at a second end opposite the first end; and render the generated three-dimensional volume for display as an output on a display, wherein the three-dimensional volume displays the sensor data associated with the portion of the formation surrounding the wellbore.

In one or more aspects, the at least one processor is configured to: display a track image representing the wellbore on the display prior to receiving the selections of the first point and the second point, wherein the first point and the second point are points along the track image.

In one or more aspects, the at least one processor is configured to: orient the two-dimensional shape in the three-dimensional environment such that the two-dimensional shape is perpendicular to a first direction corresponding to an axial direction of the wellbore at the first position.

In one or more aspects, the at least one processor is configured to: generate a second two-dimensional shape that intersects the second point, the three-dimensional volume being bound at least by the second point and the second two-dimensional shape at the second end.

In one or more aspects, the at least one processor is configured to: filter the sensor data in the subset of the plurality of voxels as a function of one or more measurement values associated with the sensor data or a range of measurement values associated with the sensor data; and render the generated three-dimensional volume for display, wherein the three-dimensional volume displays the filtered sensor data.

In one or more aspects, the at least one processor is configured to: assign, for each voxel of sensor data in the subset, a material type corresponding to one of a plurality of materials making up the portion of the formation surrounding the wellbore; receive a selection to hide or show one or more of the material types; and update the rendered three-dimensional volume output on the display to hide or show each voxel in the three-dimensional volume corresponding to the one or more material types.

In one or more aspects, the at least one processor is configured to: receive a selection to move the first point or the second point within the three-dimensional environment to a location corresponding to a third position along the length of the wellbore; in response to the selection to move the first point or the second point, update the three-dimensional volume to contain a second subset of the plurality of voxels of sensor data, the updated three-dimensional volume bounded by the moved first or second points; and render the updated three-dimensional volume for display as an output on the display.

In one or more aspects, the at least one processor is configured to: receive a selection to adjust a shape of the first two-dimensional shape within the three-dimensional environment; in response to the selection to adjust the shape of the first two-dimensional shape, update the three-dimensional volume containing a second subset of the plurality of voxels of sensor data, the updated three-dimensional volume bounded by the adjusted first two-dimensional shape; and render the updated three-dimensional volume for display as an output on the display.

One or more aspects of the present disclosure provide a non-transitory computer-readable medium storing one or more instructions that, when executed by at least one processor, cause the at least one processor to perform one or more operations including: obtaining sensor data relating to one or more measurement values of the formation proximate to a wellbore; dividing the sensor data into a plurality of voxels in a three-dimensional environment, each voxel corresponding to a location in the formation surrounding the wellbore; receiving a selection of a first point in the three-dimensional environment corresponding to a first position along a length of the wellbore; receiving a selection of a first two-dimensional shape in the three-dimensional environment, the first two-dimensional shape intersecting the first point; receiving a selection of a second point within the three-dimensional environment corresponding to a second position different from the first position along the length of the wellbore; generating a three-dimensional volume containing a subset of the plurality of voxels of sensor data associated with a portion of the formation surrounding the wellbore, the three-dimensional volume being bound at least by the first point and the first two-dimensional shape at a first end and by the second point at a second end opposite the first end; and rendering the generated three-dimensional volume for display as an output on a display, wherein the three-dimensional volume displays the sensor data associated with the portion of the formation surrounding the wellbore.

Therefore, the present disclosure is well adapted to attain the ends and advantages mentioned as well as those that are inherent therein. The particular aspects disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the elements that it introduces.

What is claimed is:

1. A method for processing sensor data associated with a formation, comprising:
   obtaining the sensor data relating to one or more measurement values of the formation proximate to a wellbore;
   dividing the sensor data into a plurality of voxels in a three-dimensional environment, each voxel corresponding to a location in the formation surrounding the wellbore;
   receiving a selection of a first point in the three-dimensional environment corresponding to a first position along a length of the wellbore;
   receiving a selection of a first two-dimensional shape in the three-dimensional environment, the first two-dimensional shape intersecting the first point;
   receiving a selection of a second point within the three-dimensional environment corresponding to a second position different from the first position along the length of the wellbore;
   receiving a selection of a second two-dimensional shape in the three-dimensional environment, the second two-dimensional shape intersecting the second point;
   generating a three-dimensional volume containing a subset of the plurality of voxels of sensor data associated with a portion of the formation surrounding the wellbore, the three-dimensional volume being bound at least by the first point and the first two-dimensional shape at a first end and by the second point and the second two-dimensional shape at a second end opposite the first end;
   generating a three-dimensional model of the sensor data within the generated three-dimensional volume; and
   rendering the generated three-dimensional volume and the three-dimensional model for display as an output on a display, wherein:
      the three-dimensional volume displays the sensor data associated with the portion of the formation surrounding the wellbore; and
      the three-dimensional model is displayed either before or after the three-dimensional volume is displayed.

2. The method of claim 1, wherein the sensor data is resistivity data relating to one or more formation resistivities of the formation proximate to the wellbore.

3. The method of claim 1, further comprising displaying a track image representing the wellbore on the display prior to receiving the selections of the first point and the second point, wherein the first point and the second point are points along the track image.

4. The method of claim 1, further comprising orienting the first two-dimensional shape in the three-dimensional environment such that the first two-dimensional shape is perpendicular to a first direction corresponding to an axial direction of the wellbore at the first position.

5. The method of claim 4, wherein the first two-dimensional shape is centered with respect to an axis corresponding to the axial direction of the wellbore at the first position.

6. The method of claim 1, wherein the first two-dimensional shape is a circle and the three-dimensional volume is a cylindrical volume extending from the first point to the second point following a path corresponding to a direction of the wellbore.

7. The method of claim 1, further comprising:
   filtering the sensor data in the subset of the plurality of voxels as a function of one or more measurement values associated with the sensor data or a range of measurement values associated with the sensor data; and rendering the generated three-dimensional volume for display, wherein the three-dimensional volume displays the filtered sensor data.

8. The method of claim 1, further comprising:
assigning, for each voxel of sensor data in the subset, a material type corresponding to one of a plurality of materials making up the portion of the formation surrounding the wellbore;
receiving a selection to hide or show one or more of the material types; and
updating the rendered three-dimensional volume output on the display to hide or show each voxel in the three-dimensional volume corresponding to the one or more material types.

9. The method of claim 1, further comprising:
receiving a selection to move the first point or the second point within the three-dimensional environment to a location corresponding to a third position along the length of the wellbore;
in response to the selection to move the first point or the second point, updating the three-dimensional volume to contain a second subset of the plurality of voxels of sensor data, the updated three-dimensional volume bounded by the moved first or second points; and
rendering the updated three-dimensional volume for display as an output on the display.

10. The method of claim 1, further comprising:
receiving a selection to adjust a shape of the first two-dimensional shape within the three-dimensional environment;
in response to the selection to adjust the shape of the first two-dimensional shape, updating the three-dimensional volume to contain a second subset of the plurality of voxels of sensor data, the updated three-dimensional volume bounded by the adjusted first two-dimensional shape; and
rendering the updated three-dimensional volume for display as an output on the display.

11. An apparatus for processing sensor data associated with a formation, comprising:
a non-transitory storage medium; and
at least one processor coupled to the non-transitory storage medium, wherein the at least one processor executes one or more instructions stored on the non-transitory storage medium to:
obtain the sensor data relating to one or more measurement values of the formation proximate to a wellbore;
divide the sensor data into a plurality of voxels in a three-dimensional environment, each voxel corresponding to a location in the formation surrounding the wellbore;
receive a selection of a first point in the three-dimensional environment corresponding to a first position along a length of the wellbore;
receive a selection of a first two-dimensional shape in the three-dimensional environment, the first two-dimensional shape intersecting the first point;
receive a selection of a second point within the three-dimensional environment corresponding to a second position different from the first position along the length of the wellbore;
receive a selection of a second two-dimensional shape that intersects the second point;
generate a three-dimensional volume containing a subset of the plurality of voxels of sensor data associated with a portion of the formation surrounding the wellbore, the three-dimensional volume being bound at least by the first point and the first two-dimensional shape at a first end and by the second point and the second two-dimensional shape at a second end opposite the first end;
generate a three-dimensional model of the sensor data within the generated three-dimensional volume; and
render the generated three-dimensional volume and the three-dimensional model for display as an output on a display, wherein:
the three-dimensional volume displays the sensor data associated with the portion of the formation surrounding the wellbore; and
the three-dimensional model is displayed either before or after the three-dimensional volume is displayed.

12. The apparatus of claim 11, wherein the at least one processor is configured to:
display a track image representing the wellbore on the display prior to receiving the selections of the first point and the second point, wherein the first point and the second point are points along the track image.

13. The apparatus of claim 11, wherein the at least one processor is configured to:
filter the sensor data in the subset of the plurality of voxels as a function of one or more measurement values associated with the sensor data or a range of measurement values associated with the sensor data; and
render the generated three-dimensional volume for display, wherein the three-dimensional volume displays the filtered sensor data.

14. The apparatus of claim 11, wherein the at least one processor is configured to:
assign, for each voxel of sensor data in the subset, a material type corresponding to one of a plurality of materials making up the portion of the formation surrounding the wellbore;
receive a selection to hide or show one or more of the material types; and
update the rendered three-dimensional volume output on the display to hide or show each voxel in the three-dimensional volume corresponding to the one or more material types.

15. The apparatus of claim 11, wherein the at least one processor is configured to:
receive a selection to move the first point or the second point within the three-dimensional environment to a location corresponding to a third position along the length of the wellbore;
in response to the selection to move the first point or the second point, update the three-dimensional volume to contain a second subset of the plurality of voxels of sensor data, the updated three-dimensional volume bounded by the moved first or second points; and
render the updated three-dimensional volume for display as an output on the display.

16. The apparatus of claim 11, wherein the at least one processor is configured to:
receive a selection to adjust a shape of the first two-dimensional shape within the three-dimensional environment;
in response to the selection to adjust the shape of the first two-dimensional shape, update the three-dimensional volume containing a second subset of the plurality of voxels of sensor data, the updated three-dimensional volume bounded by the adjusted first two-dimensional shape; and render the updated three-dimensional volume for display as an output on the display.

17. A non-transitory computer-readable medium storing one or more instructions that, when executed by at least one processor, cause the at least one processor to perform one or more operations comprising:

obtaining sensor data relating to one or more measurement values of the formation proximate to a wellbore;

dividing the sensor data into a plurality of voxels in a three-dimensional environment, each voxel corresponding to a location in the formation surrounding the wellbore;

receiving a selection of a first point in the three-dimensional environment corresponding to a first position along a length of the wellbore;

receiving a selection of a first two-dimensional shape in the three-dimensional environment, the first two-dimensional shape intersecting the first point;

receiving a selection of a second point within the three-dimensional environment corresponding to a second position different from the first position along the length of the wellbore;

receiving a selection of a second two-dimensional shape in the three-dimensional environment, the second two-dimensional shape intersecting the second point;

generating a three-dimensional volume containing a subset of the plurality of voxels of sensor data associated with a portion of the formation surrounding the wellbore, the three-dimensional volume being bound at least by the first point and the first two-dimensional shape at a first end and by the second point and the second two-dimensional shape at a second end opposite the first end;

generating a three-dimensional model of the sensor data within the generated three-dimensional volume; and rendering the generated three-dimensional volume and the three-dimensional model for display as an output on a display, wherein:

the three-dimensional volume displays the sensor data associated with the portion of the formation surrounding the wellbore; and the three-dimensional model is displayed either before or after the three-dimensional volume is displayed.

* * * * *

UNITED STATES PATENT AND TRADEMARK OFFICE
CERTIFICATE OF CORRECTION

| | |
|---|---|
| PATENT NO. | : 11,852,774 B2 |
| APPLICATION NO. | : 17/095422 |
| DATED | : December 26, 2023 |
| INVENTOR(S) | : David J. Ortiz et al. |

It is certified that error appears in the above-identified patent and that said Letters Patent is hereby corrected as shown below:

In the Specification

In Column 15, Line 39, after --three-dimensional-- delete "dimensional"

Signed and Sealed this
Twenty-fifth Day of June, 2024

Katherine Kelly Vidal
*Director of the United States Patent and Trademark Office*